(12) United States Patent
Strater et al.

(10) Patent No.: US 10,896,541 B2
(45) Date of Patent: *Jan. 19, 2021

(54) FACILITATED EDITING OF GENERATIVE DESIGN GEOMETRY IN COMPUTER AIDED DESIGN USER INTERFACE

(71) Applicant: Autodesk, Inc., San Rafael, CA (US)

(72) Inventors: Jeffrey T. Strater, Portland, OR (US); Suguru Furuta, Cambridge (GB); Kevin John Schneider, Portland, OR (US); Brian M. Frank, Lunenburg, MA (US); Michael Andrew Smell, Oakdale, PA (US); Jean Alison Flower, Uckfield (GB); Nandakumar Santhanam, Ithaca, NY (US)

(73) Assignee: Autodesk, Inc., San Rafael, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/673,476

(22) Filed: Nov. 4, 2019

(65) Prior Publication Data
US 2020/0151953 A1 May 14, 2020

Related U.S. Application Data

(63) Continuation of application No. 16/186,136, filed on Nov. 9, 2018, now Pat. No. 10,467,807.

(51) Int. Cl.
*G06T 17/30* (2006.01)
*G06F 30/23* (2020.01)
(Continued)

(52) U.S. Cl.
CPC ............ *G06T 17/30* (2013.01); *G06F 30/10* (2020.01); *G06F 30/23* (2020.01); *G06T 17/20* (2013.01);
(Continued)

(58) Field of Classification Search
CPC . G06T 17/30; G06T 17/20; G06T 2219/2021; G06T 19/20; G06T 17/10;
(Continued)

(56) References Cited

U.S. PATENT DOCUMENTS

| | | | | |
|---|---|---|---|---|
| 7,277,835 | B2 * | 10/2007 | Spitz | G06T 17/10 703/2 |
| 8,175,734 | B2 * | 5/2012 | Fogel | B33Y 50/00 703/1 |

(Continued)

OTHER PUBLICATIONS

Magalhäes, A. & Mesquita, R. "Requirements for a Solid Modeler Coupled to Finite-Element Mesh Generators" IEEE Transactions on Magnetics, vol. 34, No. 5, pp. 3447-3450 (1998) (Year: 1998).*

(Continued)

*Primary Examiner* — Jay Hann
(74) *Attorney, Agent, or Firm* — Fish & Richardson P.C.

(57) ABSTRACT

Methods, systems, and apparatus, including medium-encoded computer program products, for facilitating editing of generative design geometry of physical structures, include a method including: receiving editable smooth surface(s), e.g., a T-Spline, constructed from a mesh obtained using a generative design process; instantiating a parametric feature recipe to connect the editable smooth surface(s) with input solid(s), wherein the parametric feature recipe includes an operation sequence that (i) converts the editable smooth surface(s) into boundary representation format and (ii) combines the boundary representation formatted smooth surface(s) with the input solid(s) to produce a watertight three dimensional model of an object; modifying the editable smooth surface(s) in response to input, while preventing disconnection of the editable smooth surface(s) from the input solid(s); updating a visualization thereof in a user interface; and performing the operation sequence of the (Continued)

parametric feature recipe to produce the watertight three dimensional model of the object.

39 Claims, 8 Drawing Sheets

(51) Int. Cl.
    *G06F 30/10*         (2020.01)
    *G06T 19/20*         (2011.01)
    *G06T 17/20*         (2006.01)
    *B33Y 10/00*         (2015.01)

(52) U.S. Cl.
    CPC .............. *B33Y 10/00* (2014.12); *G06T 19/20* (2013.01); *G06T 2219/2021* (2013.01)

(58) Field of Classification Search
    CPC ..... G06T 2200/24; G06F 30/10; G06F 30/23; G06F 2113/10; G06F 2111/02; G06F 2119/18; Y02P 10/25; Y02P 90/02; B33Y 50/00; B22F 3/1055
    See application file for complete search history.

(56) References Cited

U.S. PATENT DOCUMENTS

| | | | | |
|---|---|---|---|---|
| 10,339,266 | B2* | 7/2019 | Urick | G06T 17/30 |
| 10,354,442 | B2* | 7/2019 | Hill | G06T 19/20 |
| 2003/0191554 | A1* | 10/2003 | Russell | G06T 17/20 |
| | | | | 700/187 |
| 2012/0029882 | A1 | 2/2012 | Bommes et al. | |
| 2013/0300735 | A1 | 11/2013 | Schmidt | |
| 2019/0130058 | A1* | 5/2019 | Thomas | G06T 17/20 |

OTHER PUBLICATIONS

Gujarathi, G.P. & Ma, Y. "Generative CAD and CAE Integration Using Common Data Model" IEEE Conf. on Automation Science & Engineering, pp. 586-591 (2010) (Year: 2010).*
Unknown Author, 3D Systems Geomagic Design—Geomagic Design X Scan-to-CAD solid model software, Nov. 8, 2018 (or earlier), https://uk.3dsystems.com/software/geomagic-design-x (retrieved Nov. 28, 2018).
Alliez, P., et al, Anisotropic Polygonal Remeshing, 2003, *Proc. of ACM SIGGRAPH 03*, 485-493.
Alliez, P., et al., 3D Fast Intersection and Distance Computation (AABB Tree): User Manual, Nov. 8, 2018 (or earlier), In: {*CGAL*} *User and Reference Manual*, CGAL Editorial Board.
Alliez, P., et al., *Recent Advances in Remeshing of Surfaces*, 2005, published online.
Arnon, D., A Cellular Decomposition Algorithm for Semialgebraic Sets, 1979, In: ©Springer, Berlin, Heidelberg, 301-315.
Attene, M., et al., Hierarchical Mesh Segmentation Based on Fitting Primitives, 2006, *The Visual Computer* 22, 3, 181-193.
Unknown Author, Autodesk Dreamcatcher. Project Dreamcatcher | Autodesk Research, Nov. 8, 2018 (or earlier), https://autodeskresearch.com/projects/dreamcatcher (retrieved Nov. 27, 2018).
Unknown Author, Autodesk—Product Update—What's New—Fusion 360 Blog, Oct. 15, 2018, https://www.autodesk.com/products/fusion-360/blog/october-15-2018-product-update-whats-new/ (retrieved Oct. 16, 2018).
Unknown Author, Autodesk Powershape. PowerShape | Manufacturing CAD Software for Complex Parts | Autodesk, Nov. 8, 2018 (or earlier), https://www.autodesk.com/products/powershape/overview# (retrieved Nov. 27, 2018).
Unknown Author, Autodesk Powershape. PowerShape 2019 | Easy-to-Use CAD Software Features | Autodesk, https://www.autodesk.com/products/powershape/features (retrieved Oct. 8, 2018).
Unknown author, B-SPLINE—Wikipedia, https://en.wikipedia.org/wiki/B-spline (retrieved Oct. 7, 2018).
Bajaj, C.L., et al., Reconstructing Surfaces and Functions on Surfaces from Unorganized Three-Dimensional Data, 1997, *Algorithmica* 19, 1-2, 243-261.
Benkö, P., et al., Algorithms for Reverse Engineering Boundary Representation Models, 2001, *Computer-Aided Design* 33, 11, 839-851.
Berger, M., et al. 2017. A Survey of Surface Reconstruction from Point Clouds, Nov. 8, 2018 (or earlier), *Computer Graphics Forum* 36, 1, 301-329.
Bommes, D., et al., Integer-grid Maps for Reliable Quad Meshing, 2013, *ACM Transactions on Graphics* 32, 4, 1.
Bommes, D., et al., Quad-Mesh Generation and Processing: A Survey, 2013, *Computer Graphics Forum* 32, 6, 51-76.
Bommes, D., et al., Mixed-integer Quadrangulation, 2009, *ACM Transactions on Graphics* 28, 3, 1.
Unknown Author, Boundary Representation—Wikipedia, https://en.wikipedia.org/wiki/Boundary_representation (retrieved Oct. 7, 2018).
Brackett, D., et al., Topology Optimization for Additive Manufacturing, 2011, *Proceedings of the solid freeform fabrication symposium*, Austin, TX, 348-362.
Buonamici, F., et al. 2018. Reverse Engineering Modeling Methods and Tools: A Survey. *Computer-Aided Design and Applications* 15, 3, 443-464, published online Nov. 16, 2017.
Campen, M., et al., Quantized Global Parametrization, 2015, *ACM Transactions on Graphics* 34, 6, 1-12.
Catmull, E. and Clark, J., Recursively Generated B-spline Surfaces on Arbitrary Topological Meshes, 1978, *Computer Aided Design* 10, 6, 350-355.
Cazals, F. and Pouget, M., Estimating Differential Quantities Using Polynomial Fitting of Osculating Jets, 2005, *Computer Aided Geometric Design* 22, 2, 121-146.
Chaikin, G.M., An Algorithm for High Speed Curve Generation, 1974, *Computer Graphics and Image Processing* 20, 3, 346-349.
Chen, M. and Townsend, T. 1987. Efficient and Consistent Algorithms for Determining the Containment of Points in Polygons and Polyhedra. EG 1987—*Technical Papers*, Eurographics Association.
Chen, X., et al., SVM-Based Topological Optimization of Tetrahedral Meshes, 2013, In: *Proceedings of the 21st International Meshing Roundtable*. ©Springer Berlin Heidelberg, Berlin, Heidelberg, 211-224.
Cohen-Steiner, D., et al., Variational Shape Approximation. 2004, *Proc. of ACM SIGGRAPH 04*, ACM Press, 905-914.
Cohen-Steiner, D. and Morvan, J.M., Restricted Delaunay Triangulations and Normal Cycle, 2003. *19th Annu. ACM Sympos. Comput. Geom.*, 237-246.
Van Dijk, N.P., et al. 2013. Level-set Methods for Structural Topology Optimization: A Review. *Structural and Multidisciplinary Optimization* 48, 3, 437-472.
Eck, M. and Hoppe, H., Automatic Reconstruction of B-Spline Surfaces of Arbitrary Topological Type, 1996, *Proc. of SIGGRAPH 96*, 325-334.
Ehmann, S.A. and Lin, M.C. 2001. Accurate and Fast Proximity Queries Between Polyhedra Using Convex Surface Decomposition. *Eurographics* 2001, 20, 3, 11 pages.
Unknown Author, Fusion 360 | Learning | Boundary Fill Dialog Box, http://help.autodesk.com/view/fusion360/ENU/?guid=GUID-A7D2D2C8-47FB-4AC4-807 (retrieved Oct. 8, 2018).
Unknown Author, Product—FRUSTUM, Nov. 8, 2018 (or earlier), https://www.frustum.com/product (retrieved Nov. 28, 2018).
Garland, M., et al. 2001. Hierarchical Face Clustering on Polygonal Surfaces. *2001 ACM Symposium on Interactive 3D Graphics*, 49-58.
Geng, Z. and Bidanda, B. 2017. Review of Reverse Engineering Systems—Current State of the Art. *Virtual and Physical Prototyping* 12, 2, 161-172, published online Mar. 22, 2017.
Granados, M., et al. 2003. Boolean Operations on 3D Selective Nef Complexes Data Structure, Algorithms, and Implementation. *Algorithms—ESA 2003: 11th Annual European Symposium*, © Springer, 174-186.
Grinspun, E., et al., Computing Discrete Shape Operators on General Meshes, 2006, *Computer Graphics Forum* 25, 3, 547-556.

(56) References Cited

OTHER PUBLICATIONS

Gu, X. and Yau, S.T. 2003. Global Conformal Surface Parameterization. *Proceedings of the 2003 Eurographics/ACM SIGGRAPH Symposium on Geometry Processing*, Eurographics Association, 127-137.

Hachenberger, P. and Kettner, L. 2018. 3D Boolean Operations on Nef Polyhedra: User Manual, Nov. 8, 2018 (or earlier). In: {*CGAL*} *User and Reference Manual*. CGAL Editorial Board.

Hoppe, H., et al., Piecewise Smooth Surface Reconstruction, 1994, *Proc. of ACM SIGGRAPH 94*, 295-302.

Hoppe, H., et al., Surface Reconstruction from Unorganized Points, 1992, *Proc. of ACM SIGGRAPH 92*,71-78.

Jackson, D.J., Boundary Representation Modelling with Local Tolerances, 1995, *Proceedings of the third ACM symposium on Solid modeling and applications—SMA '95*, ACM Press, 247-254.

Ju, T., et al., Dual Contouring of Hermite Data, 2002, *Proc. of ACM SIGGRAPH 02*, 339-346.

Knöppel, F., et al., Globally Optimal Direction Fields, 2013, *ACM Transactions on Graphics* 32, 4, 1.

Kobbelt, L., et al., Feature Sensitive Surface Extraction from Volume Data, 2001, *Proc. of ACM Siggraph 01* , 57-66.

Krishnamurthy, V. and Levoy, M., Fitting Smooth Surfaces to Dense Polygon Meshes, 1996, *Proceedings of the 23rd annual conference on Computer graphics and interactive techniques—SIGGRAPH '96*, ACM Press, 313-324.

Kruth, J.-P. and Kerstens, A., Reverse Engineering Modelling of Free-form Surfaces from Point Clouds Subject to Boundary Conditions, 1998, *Journal of Materials Processing Technology* 76, 1-3, 120-127.

Lai, L.M. and Yuen, M.M.F., Blending of Mesh Objects to Parametric Surface, 2015, *Computers & Graphics* 46, C, 283-293.

Li, W.C., et al., Automatic and Interactive Mesh to T-Spline Conversion, 2006, *Proc. of the Symposium on Geometry Processing*, 191-200.

Unknown Author, LimitState:3D, Nov. 8, 2018 (or earlier), http://limitstate3d.com/ (retrieved Nov. 28, 2018).

Litke, N., Levin, A., and Schröder, P., Fitting Subdivision Surfaces, 2001, *IEEE Visualization 2001*, 319-324.

Liu, J., et al., Current and Future Trends in Topology Optimization for Additive Manufacturing, 2018, *Structural and Multidisciplinary Optimization*. https://doi.org/10.1007/s00158-018-199403, © Springer, published online May 3, 2018.

Lorensen, W.E. and Cline, H.E., Marching Cubes: A High Resolution 3D Surface Construction Algorithm, 1987, *Proc. of ACM SIGGRAPH 87*, 163-170.

Ma, W., et al., A Direct Approach for Subdivision Surface Fitting from a Dense Triangle Mesh, 2004, *Computer-Aided Design* 36, 6, 525-536.

Mangan, A.P. and Whitaker, R.T., Partitioning 3D Surface Meshes Using Watershed Segmentation, 1999, *IEEE Transactions on Visualization and Computer Graphics* 5, 4, 308-321.

Marinov, M. and Kobbelt, L., Optimization Techniques for Approximation with Subdivision Surfaces, 2004, in *ACM Symposium on Solid Modeling and Applications* pp. 1-10.

Marinov, M. and Kobbelt, L., Optimization Methods for Scattered Data Approximation with Subdivision Surfaces, 2005, *Graphical Models* 67, 5, 452-473.

Marinov, M. and Kobbelt, L., Automatic Generation of Structure Preserving Multiresolution Models, 2005, *Comput. Graph. Forum*, vol. 24, No. 3, pp. 479,486.

Meyer, M., et al., Discrete Differential-geometry Operators for Triangulated 2-Manifolds, 2003, In: H.C. Hege and K. Polthier, eds., *Visualization and Mathematics III*. © Springer-Verlag, Heidelberg, 35-57.

Unknown Author, MSC Nastran—Multidisciplinary Structural Analysis, Nov. 8, 2018 (or earlier), http://www.mscsoftware.com/product/msc-nastran (retrieved Nov. 28, 2018).

Murali, T.M. and Funkhouser, T.A., "Consistent Solid and Boundary Representations from Arbitrary Polygonal Data," Proceedings of the 1997 Symposium on Interactive 3D Graphics, pp. 155-162, 1997.

Myles, A., et al., Robust Field-aligned Global Parametrization, 2014, *ACM Transactions on Graphics* 33, 4, 1-14.

Unknown Author, Non-Uniform Rational B-Spline—Wikipedia, https://en.wikipedia.org/wiki/Non-uniform_rational_B-spline (retrieved Oct. 7, 2018).

Unknown Author, Polygon Mesh—Wikipedia, https://en.wikipedia.org/wiki/Polygon_mesh (retrieved Oct. 7, 2018).

Ray, N., et al., Periodic Global Parameterization, 2006, *ACM Trans. Graph.*, ACM, 1460-1485.

Rouhani, M., et al., Implicit B-Spline Surface Reconstruction, 2015, *IEEE Transactions on Image Processing* 24, 1, 22-32.

Sederberg, T.W., et al., T-spline Simplification and Local Refinement, 2004, *Proc. of ACM SIGGRAPH 04*, 276-283.

Sederberg, T.W., et al., T-splines and T-NURCCs, 2003, *Proc. of ACM SIGGRAPH 03*, 477-484.

Unknown Author, Convergent Modeling | Siemens, Nov. 8, 2018 (or earlier), https://www.plm.automation.siemens.com/global/en/our-story/glossary/convergent-modeling/24461 (retrieved Nov. 28, 2018).

Unknown Author, D-CUBED Collision Detection Manager: Siemens PLM Software, Nov. 8, 2018 (or earlier). https://www.plm.automation.siemens.com/en/products/open/d-cubed/cdm/index.shtml (retrieved Nov. 28, 2018).

Unknown Author, Parasolid | Siemens, Nov. 8, 2018 (or earlier), https://www.plm.automation.siemens.com/global/en/products/plm-components/parasolid.html (retrieved Nov. 28, 2018).

Unknown Author, Subdivision Surface—Wikipedia, https://en.wikipedia.org/wiki/Subdivision_surface (retrieved Oct. 7, 2018).

Unknown Author, T-Spline—Wikipedia, https://en.wikipedia.org/wiki/T-spline (retrieved Oct. 7, 2018).

Taubin, G., A Signal Processing Approach to Fair Surface Design, 1995, *Proc. of ACM SIGGRAPH 95*, 351-358.

Unknown Author, Six Reasons Watertight Models Matter | TransMagic, https://transmagic.com/six-reasons-watertight-models-matter/ (retrieved Oct. 15, 2018).

Wang, Y. and Zheng, J. 2007. Adaptive T-spline Surface Approximation of Triangular Meshes. 2007 6th *International Conference on Information, Communications and Signal Processing, ICICS*, IEEE, 1-5.

Wu, J. and Kobbelt, L., Structure Recovery via Hybrid Variational Surface Approximation, 2005, *Computer Graphics Forum* 24, 3, 277-284.

Wu, X., et al., Variational Reconstruction Using Subdivision Surfaces with Continuous Sharpness Control, 2017, *Computational Visual Media* 3, 3, 217-228.

Yan, D.M., et al., Quadric Surface Extraction by Variational Shape Approximation, 2006, In: ©Springer, Berlin, Heidelberg, 73-86.

Yan, D.M., et al., Variational Mesh Segmentation via Quadric Surface Fitting, 2012, *Computer-Aided Design* 44, 11, 1072-1082.

Zhang, M., et al. 2010. A Wave-based Anisotropic Quadrangulation Method. *ACM SIGGRAPH 2010 papers on—SIGGRAPH '10*, ACM Press, 1.

\* cited by examiner

FIG. 3B
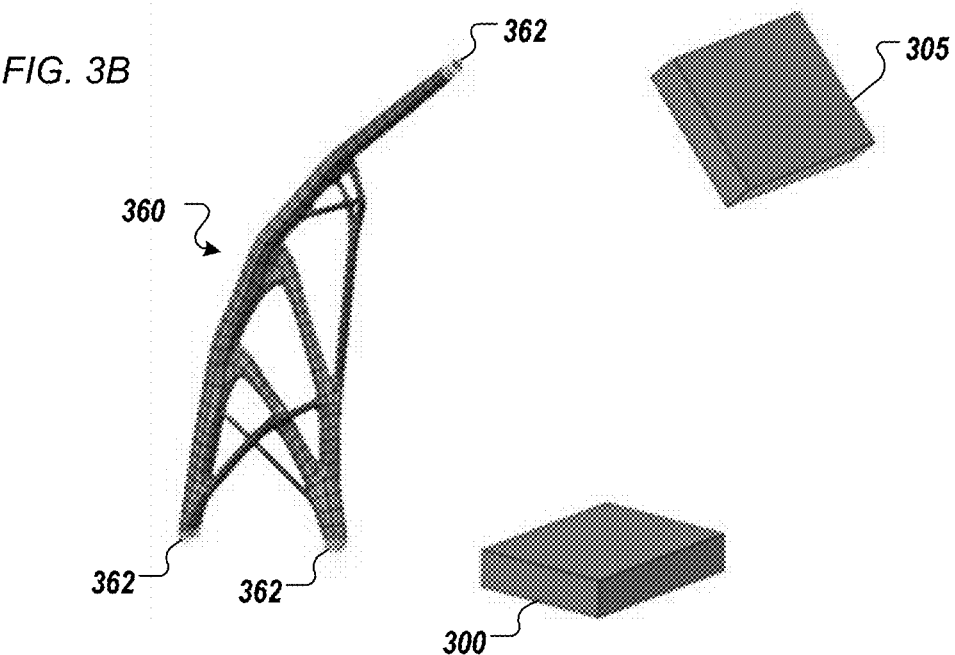
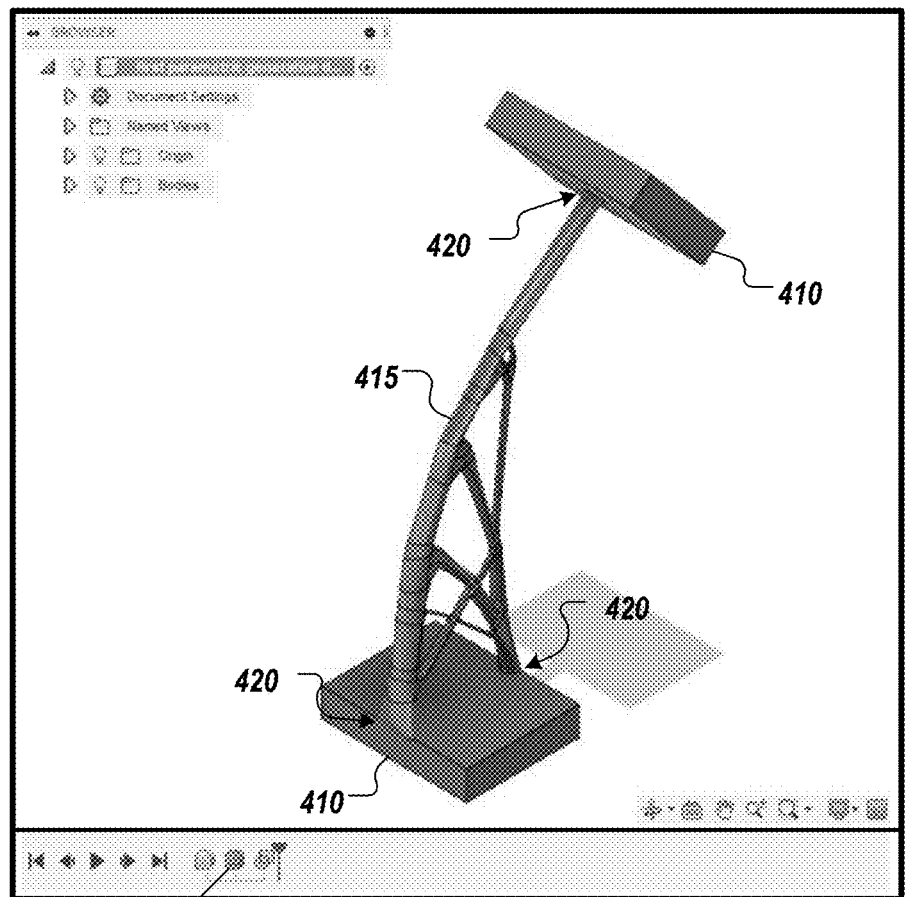
FIG. 4A

FACILITATED EDITING OF GENERATIVE DESIGN GEOMETRY IN COMPUTER AIDED DESIGN USER INTERFACE

CROSS-REFERENCE TO RELATED APPLICATION

This is a continuation of, and claims priority to, U.S. patent application Ser. No. 16/186,136, filed on Nov. 9, 2018, the disclosure of which is considered part of and is incorporated by reference in the disclosure of this application.

BACKGROUND

This specification relates to computer aided design of physical structures, which can be manufactured using additive manufacturing, subtractive manufacturing and/or other manufacturing systems and techniques.

Computer Aided Design (CAD) software has been developed and used to generate three-dimensional (3D) representations of objects, and Computer Aided Manufacturing (CAM) software has been developed and used to manufacture the physical structures of those objects, e.g., using Computer Numerical Control (CNC) manufacturing techniques. Typically, CAD software stores the 3D representations of the geometry of the objects being modeled using a boundary representation (B-Rep) format. A B-Rep model is a set of connected surface elements specifying boundaries between a solid portion and a non-solid portion of the modelled 3D object. In a B-Rep model (often referred to as a B-Rep), geometry is stored in the computer using smooth and precise mathematical surfaces, in contrast to the discrete and approximate surfaces of a mesh model, which can be difficult to work with in a CAD program.

Further, CAD programs have been used in conjunction with additive manufacturing systems and techniques. Additive manufacturing, also known as solid free form fabrication or 3D printing, refers to any manufacturing process where 3D objects are built up from raw material (generally powders, liquids, suspensions, or molten solids) in a series of layers or cross-sections. Examples of additive manufacturing include Fused Filament Fabrication (FFF) and Selective Laser Sintering (SLS). Further, subtractive manufacturing refers to any manufacturing process where 3D objects are created from stock material (generally a "blank" or "workpiece" that is larger than the 3D object) by cutting away portions of the stock material.

In addition, CAD software has been designed so as to perform automatic generation of 3D geometry (generative design) for a part or one or more parts in a larger system of parts to be manufactured. This automated generation of 3D geometry is often limited to a design space specified by a user of the CAD software, and the 3D geometry generation is typically governed by design objectives and constraints, which can be defined by the user of the CAD software or by another party and imported into the CAD software. The design objectives (such as minimizing the waste material or weight of the designed part) can be used to drive the geometry generation process toward better designs. The design constraints can include both structural integrity constraints for individual parts (i.e., a requirement that a part should not fail under the expected structural loading during use of the part) and physical constraints imposed by a larger system (i.e., a requirement that a part not interfere with another part in a system during use). Further, the inputs to a generative design process can include a set of input solids (B-Rep input) that specify boundary conditions for the generative design process, but many modern generative design solvers do not operate directly on the exact surface boundary representation of their input solids. Instead, B-Reps are sampled and replaced with volumetric representations such as level sets or tetrahedral or hexahedral meshes, which are significantly more convenient and efficient for the physical simulations and material synthesis computed by the solver.

SUMMARY

This specification describes technologies relating to user interfaces for editing of generative design geometry in computer aided design of physical structures, which can be manufactured using additive manufacturing, subtractive manufacturing and/or other manufacturing systems and techniques.

In general, one or more aspects of the subject matter described in this specification can be embodied in one or more methods, including: receiving, by a computer aided design program, one or more editable smooth surfaces, wherein each of the one or more editable smooth surfaces has a globally smooth parameterization, which permits globally smooth free-form surface editing, and each of the one or more editable smooth surfaces has been constructed from at least a portion of a polygon mesh that has been obtained using a generative design process employing one or more input solids as one or more sub-spaces of an optimization domain of the generative design process, the one or more input solids being in a boundary representation format; and rendering, by the computer aided design program, a visualization of the one or more editable smooth surfaces and the one or more input solids to a display device presenting a user interface of the computer aided design program. The method(s) further include: instantiating, by the computer aided design program, a parametric feature recipe to connect the one or more editable smooth surfaces with the one or more input solids, wherein the parametric feature recipe includes an operation sequence that (i) converts the one or more editable smooth surfaces into the boundary representation format and (ii) combines the one or more boundary representation formatted smooth surfaces with the one or more input solids to produce a watertight three dimensional model of an object; and modifying, by the computer aided design program, the one or more editable smooth surfaces in response to user input received through an input device associated with the user interface of the computer aided design program, while preventing disconnection of the one or more editable smooth surfaces from the one or more input solids. The method(s) further include: updating, by the computer aided design program, the visualization presented in the user interface on the display device responsive to the modifying; and performing, by the computer aided design program, the operation sequence of the parametric feature recipe to convert and combine the one or more editable smooth surfaces, as modified by the user input, with the one or more input solids to produce the watertight three dimensional model of the object.

The one or more editable smooth surfaces can include at least one T-Spline surface, the parametric feature recipe can include an intersecting boundary fill recipe, and the operation sequence can include: converting an extended version of the at least one T-spline surface, as modified by the user input, into a modified surface in the boundary representation format; identifying a three dimensional region in which the modified surface in the boundary representation format intersects at least a portion of the one or more input solids; and using the identified three dimensional region to combine the modified surface in the boundary representation format with the one or more input solids to form a closed solid in the watertight three dimensional model of the object.

The one or more editable smooth surfaces can include at least one T-Spline surface, the parametric feature recipe can include a Boolean combination recipe, and the operation sequence can include: converting the at least one T-spline surface, as modified by the user input, into a modified surface in the boundary representation format; closing off the modified surface in the boundary representation format to form a modified solid; and performing a Boolean combination of the modified solid with the one or more input solids to form a closed solid in the watertight three dimensional model of the object.

The one or more editable smooth surfaces can include at least one T-Spline surface, the parametric feature recipe can include a stitch recipe, and the operation sequence can include: cutting out at least one surface portion of the one or more input solids where the at least one T-Spline surface intersects with at least a portion of the one or more input solids, thereby forming a hole in at least one of the one or more input solids; converting the at least one T-spline surface, as modified by the user input, into a modified surface in the boundary representation format; and stitching the modified surface in the boundary representation format to the at least one of the one or more input solids along one or more edges of the hole to form a closed solid in the watertight three dimensional model of the object.

The generative design process can employ a volumetric mesh method or a level set method to produce a generative design, and the polygon mesh can include a triangle mesh. The computer aided design program can include two or more programs that operate cooperatively on two or more separate computer processors. The method(s) can include providing, by the computer aided design program, the watertight three dimensional model for use in manufacturing a physical structure corresponding to the object using one or more computer-controlled manufacturing systems.

The providing can include saving the watertight three dimensional model to a permanent storage device for use in manufacturing the physical structure corresponding to the object using the one or more computer-controlled manufacturing systems. The one or more computer-controlled manufacturing systems can include an additive manufacturing machine, and the providing can include: generating toolpath specifications for the additive manufacturing machine using the watertight three dimensional model; and manufacturing at least a portion of the physical structure corresponding to the object with the additive manufacturing machine using the toolpath specifications generated for the additive manufacturing machine.

These and other methods described herein can be implemented using a non-transitory computer-readable medium encoding a computer aided design program operable to cause one or more data processing apparatus to perform the method(s). In some implementations, a system includes: a non-transitory storage medium having instructions of a computer aided design program stored thereon; and one or more data processing apparatus configured to run the instructions of the computer aided design program to perform the method(s). Further, such systems can include an additive manufacturing machine, or other manufacturing machines, and the one or more data processing apparatus can be configured to run the instructions of the computer aided design program to generate instructions for such machines (e.g., toolpath specifications for the additive manufacturing machine) from the watertight three dimensional model, and manufacture the physical structure corresponding to the object with the machines using the instructions (e.g., the additive manufacturing machine using the toolpath specifications).

Particular embodiments of the subject matter described in this specification can be implemented to realize one or more of the following advantages. Building a parametric feature recipe for use in converting and combining one or more editable smooth surfaces (e.g., T-Spline surfaces) produced by a generative design process facilitates editing of those surfaces before conversion to B-Rep format and combination into a watertight 3D model in a CAD system. Readily editable smooth surfaces (e.g., T-Spline surfaces) can be modified by the user, rather than requiring mesh editing, which can be time consuming, especially for the complex shapes typically created by generative design methods, and an automated workflow for producing B-Rep solids from the edited smooth surfaces can significantly reduce the time needed for the user to create a watertight 3D model that is ready for use in manufacturing. Further, the produced B-Rep solids facilitate further processing in that the precise mathematical surfaces are easier to work with using precise modeling tools and CAD modeling operations (e.g., geometric modeling operations, such as holes, fillets or shells, and creating assembly relationships, such as mechanical joints), A generative design editor user interface can be made easier to use and provide significant flexibility for engineers and designers when making revisions to generated geometry (1) for aesthetic reasons, (2) because some aspects of the generated geometry may be too small to be manufactured reliably, and/or (3) to increase the margin of safety and reliability for the object to be manufactured. Using a parametric feature recipe, as described herein, can simplify the user interface for editing generated geometry in a display device while also providing flexibility in modifying the edited geometry multiple times without risking disconnection of the generated geometry from other bodies in the 3D model, thus ensuring that precise, watertight 3D models are produced for use in subsequent CAD/CAM operations.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

FIG. 3B shows an example of input to the process of FIG. 2, including an organic body, which has been produced from the separated generative design geometry of FIG. 3A, and two input solids.

FIG. 4A shows an example of a user interface with a parametric feature recipe instantiated using the input of FIG. 3B.

Like reference numbers and designations in the various drawings indicate like elements.

DETAILED DESCRIPTION

Figure 1:
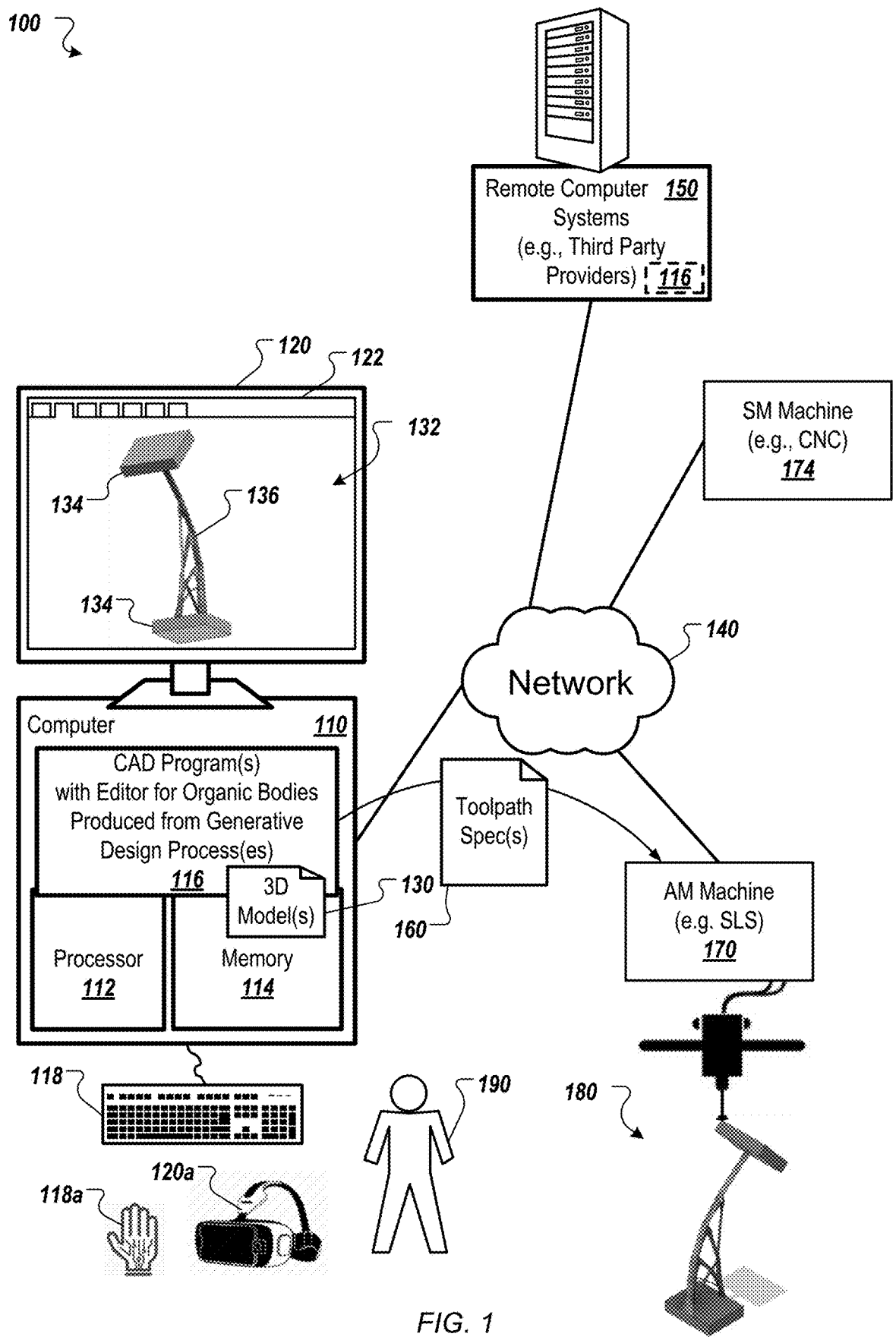
FIG. 1 shows an example of a system usable to modify generative design geometry in computer aided design of physical structures, which can then be manufactured using additive manufacturing, subtractive manufacturing and/or other manufacturing systems and techniques.

FIG. 1 shows an example of a system 100 usable to modify generative design geometry in computer aided design of physical structures, which can then be manufactured using additive manufacturing, subtractive manufacturing and/or other manufacturing systems and techniques. A computer 110 includes a processor 112 and a memory 114, and the computer 110 can be connected to a network 140, which can be a private network, a public network, a virtual private network, etc. The processor 112 can be one or more hardware processors, which can each include multiple processor cores. The memory 114 can include both volatile and non-volatile memory, such as Random Access Memory (RAM) and Flash RAM. The computer 110 can include various types of computer storage media and devices, which can include the memory 114, to store instructions of programs that run on the processor 112, including Computer Aided Design (CAD) program(s) 116, which implement three-dimensional (3D) modeling functions and includes an editor for organic bodies produced from one or more generative design processes. Further, the CAD program(s) 116 can potentially implement physical simulation (finite element analysis (FEA) or other), generative design, and/or manufacturing control functions.

As used herein, CAD refers to any suitable program used to design physical structures that meet specified design requirements, regardless of whether or not the program is capable of interfacing with and/or controlling specific manufacturing equipment. Thus, CAD program(s) 116 can include Computer Aided Engineering (CAE) program(s), Computer Aided Manufacturing (CAM) program(s), etc. The program(s) 116 can run locally on computer 110, remotely on a computer of one or more remote computer systems 150 (e.g., one or more third party providers' one or more server systems accessible by the computer 110 via the network 140) or both locally and remotely. Thus, a CAD program 116 can be two or more programs that operate cooperatively on two or more separate computer processors in that a program 116 operating locally at computer 110 can offload processing operations (e.g., generative design and/or physical simulation operations) "to the cloud" by having one or more programs 116 on one or more computers 150 perform the offloaded processing operations.

The CAD program(s) 116 present a user interface (UI) 122 on a display device 120 of the computer 110, which can be operated using one or more input devices 118 of the computer 110 (e.g., keyboard and mouse). Note that while shown as separate devices in FIG. 1, the display device 120 and/or input devices 118 can also be integrated with each other and/or with the computer 110, such as in a tablet computer (e.g., a touch screen can be an input/output device 118, 120). Moreover, the computer 110 can include or be part of a virtual reality (VR) or augmented reality (AR) system. For example, the input/output devices 118, 120 can include a VR/AR input glove 118a and/or a VR/AR headset 120a.

As noted above, the CAD program(s) 116 implement 3D modeling functions, which means a 3D model 132 can be built using the CAD program(s) 116. In some implementations, the CAD program(s) 116 implement physical simulation to assist in building the 3D model 132. Physical simulations, such as FEA, Computational Fluid Dynamics (CFD), Acoustics/Noise Control, thermal conduction, and/or computational injection molding simulations are often integral components in CAD-based product development. The CAD program(s) 116 can be used to build precise geometric descriptions of the design model, while physical simulations enable improved performance without time consuming physical testing.

The CAD program(s) 116 can provide user interface elements that enable the user to specify inputs for the physical simulation(s), such as materials and loading cases for the 3D model(s) 132, where the loading cases define loads in different directions to be borne by a part being designed. Thus, a user 190 can interact with the UI 122 of the CAD program(s) 116, including producing a full mechanical problem definition for a part to be manufactured, so as to build and modify 3D model(s) 132, which can be stored in 3D model document(s) 130. In the example of FIG. 1, the 3D model 132 is of a simple strut, but this is merely one of many possible 3D models that can be designed using the systems and techniques described herein.

Moreover, in some implementations, the CAD program(s) 116 implement at least one generative design method, which enables the CAD program(s) 116 to generate one or more portions of the 3D model(s) 132 automatically (or the entirety of a 3D model) based on design constraints, where the geometric design is iteratively optimized based on simulation feedback. Note that, as used herein, "optimization" (or "optimum") does not mean that the best of all possible designs is achieved in all cases, but rather, that a best (or near to best) design is selected from a finite set of possible designs that can be generated within an allotted time, given the available processing resources. The design constraints can be defined by the user 190, or by another party and imported into the CAD program(s) 116. The design constraints can include both structural integrity constraints for individual parts (e.g., a requirement that a part should not fail under the expected structural loading during use of the part) and physical constraints imposed by a larger system (e.g., a requirement that a part be contained within a specified volume so as not to interfere with other part(s) in a system during use).

Various generative design processes can be used, which can optimize the shape and topology of at least a portion of the 3D model. The iterative optimization of the geometric design of the 3D model(s) by the CAD program(s) 116 involves topology optimization, which is a method of lightweighting where the optimum distribution of material is determined by minimizing an objective function subject to constraints (e.g., structural compliance with volume as a constraint). Topology optimization can be addressed using a variety of numerical methods, which can be broadly classified into two groups: (1) material or microstructure techniques, and (2) geometrical or macrostructure techniques. Microstructure techniques are based on determining the optimum distribution of material density and include the Solid Isotropic Material with Penalization (SIMP) method and the homogenization method. In the SIMP method, intermediate material densities are penalized to favor either having p=0 or p=1, denoting a void or a solid, respectively. Intermediate material densities are treated as composites in the homogenization method.

In contrast, macrostructure techniques treat the material as being homogeneous, and the three dimensional topology of the modeled object being produced is represented as one or more boundaries between one or more solid regions (having the homogenous material therein) and one or more void regions (having no material therein) within the design space (also referred to as the domain or a sub-space of the domain for topology optimization). The shape(s) of the one or more boundaries is optimized during the generative design process, while the topology is changed in the domain as a result of the shape optimization in combination with adding/removing and shrinking/growing/merging the void region(s). Thus, the types of final optimized topologies that can result from a generative design process using a macrostructure technique can depend significantly on the number and sizes of voids within the seed geometry for the process.

In the example of FIG. 1, the 3D model 132 includes input solids 134 in B-Rep format, referred to herein as preserve bodies, which specify boundary conditions for the generative design process. Further, the 3D model 132 includes one or more editable smooth surfaces 136, e.g., one or more T-Spline surfaces, referred to herein as an organic body, that have been constructed from a polygon mesh output of the generative design process. The user 190 employs the UI 122 to modify the editable smooth surface(s) 136, as described further below, and the CAD program(s) 116 produce from the modified surface(s) 136 and the B-Rep solids 134 a watertight 3D model of an object. Moreover, because the solids 134 are in B-Rep format, they are also editable, either before or after their use as inputs to the generative design process. Nonetheless, for the remainder of this description, it will be presumed that the B-Rep solids 134 are not edited after they are used as input to the generative design process.

In addition, in some implementations, the CAD program(s) 116 implement manufacturing control functions. Once the user 190 is satisfied with a 3D model 132, the 3D model 132 can be stored as a 3D document 130 and/or used to generate another representation of the model (e.g., an .STL file for additive manufacturing). This can be done upon request by the user 190, or in light of the user's request for another action, such as sending the 3D model 132 to an additive manufacturing (AM) machine 170, or other manufacturing machinery, which can be directly connected to the computer 110, or connected via a network 140, as shown. This can involve a post-process carried out on the local computer 110 or a cloud service to export the 3D model 132 to an electronic document from which to manufacture. Note that an electronic document (which for brevity will simply be referred to as a document) can be a file, but does not necessarily correspond to a file. A document may be stored in a portion of a file that holds other documents, in a single file dedicated to the document in question, or in multiple coordinated files.

In any case, the CAD program(s) 116 can provide a document 160 (having toolpath specifications of an appropriate format) to the AM machine 170 to produce a complete structure 180, which includes the generated and edited shape and topology. The AM machine 170 can employ one or more additive manufacturing techniques, such as granular techniques (e.g., Powder Bed Fusion (PBF), Selective Laser Sintering (SLS) and Direct Metal Laser Sintering (DMLS)), extrusion techniques (e.g., Fused Deposition Modelling (FDM), which can include metals deposition AM). In addition, the user 190 can save or transmit the 3D model 132 for later use. For example, the CAD program(s) 116 can store the document 130 that includes the 3D model 132.

In some implementations, subtractive manufacturing (SM) machine(s) 174 (e.g., a Computer Numerical Control (CNC) milling machine, such as a multi-axis, multi-tool milling machine) can be used in the manufacturing process. Such SM machine(s) 174 can be used to prepare initial workpieces on which AM machine(s) 170 will operate. In some implementations, a partially complete structure 180 is generated by the AM machine(s) 170 and/or using casting methods (e.g., investment casting (IC) using ceramic shell or sand casting (SC) using sand cores), and this partially complete structure 180 then has one or more portions removed (e.g., finishing) by the CNC machine 174 in order to form the completed structure. Moreover, in some implementations, the CAD program(s) 116 can provide a corresponding document 160 (having toolpath specifications of an appropriate format, e.g., a CNC numerical control (NC) program) to the SM machine 174 for use in manufacturing the part using various cutting tools, etc. In general, various different manufacturing systems and techniques can be employed, either alone or in combination, to produce a final structure, and the CAD program(s) 116 can include suitable algorithms to generate toolpath specifications 160 for one or more of these various systems to manufacture a part that has been designed using the editing systems and techniques described in this application.

Figure 2:
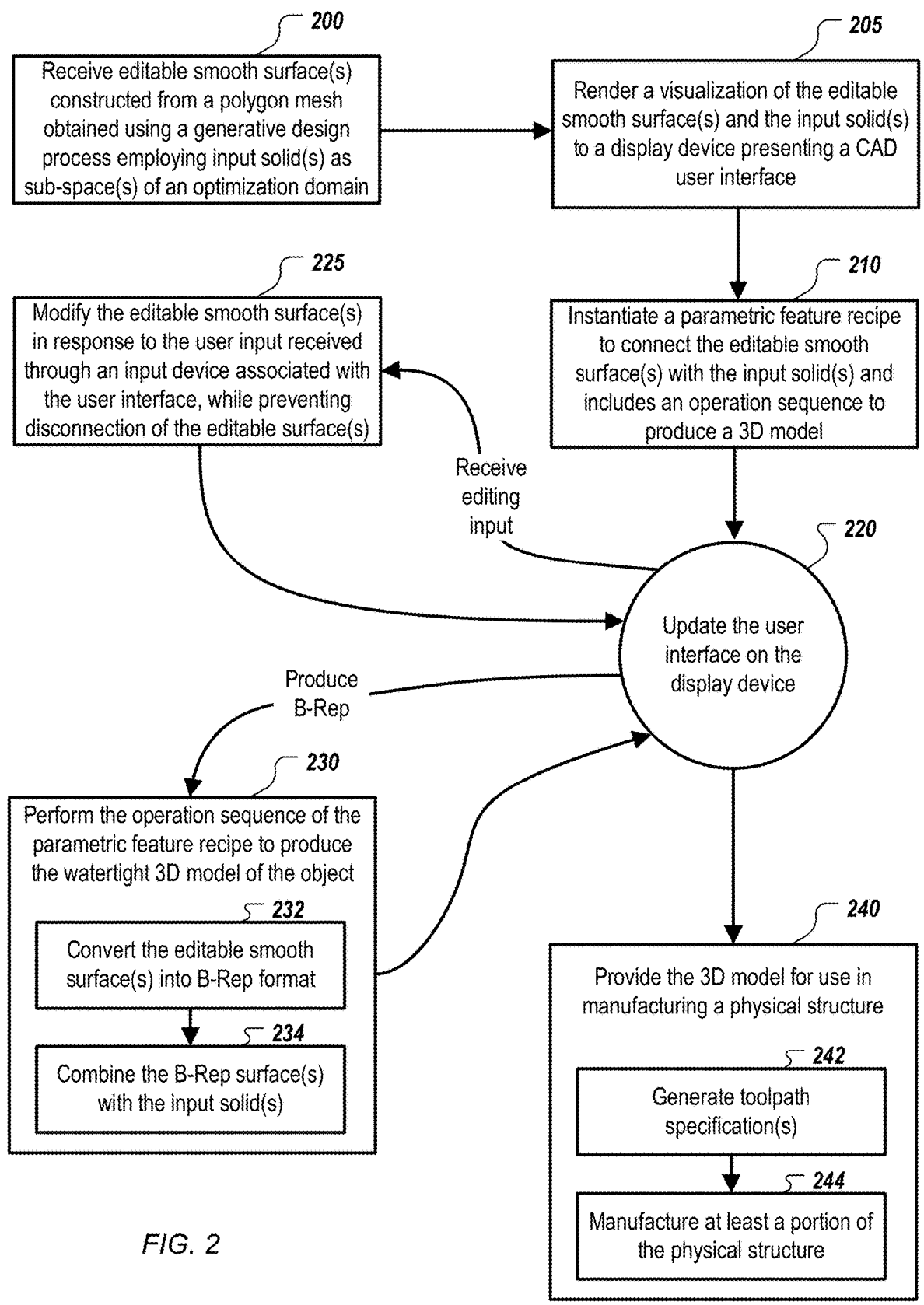
FIG. 2 show an example of a process for editing generative design geometry.

FIG. 2 show an example of a process for editing generative design geometry. One or more editable smooth surfaces (an organic body) are received 200, e.g., by CAD program(s) 116, where each of the one or more editable smooth surfaces has a globally smooth parameterization, which permits globally smooth free-form surface editing. For example, the one or more editable smooth surfaces can be one or more T-Spline surfaces, one or more Non-Uniform Rational Basis Spline (NURBS) surfaces, and/or one or more Catmull-Clark subdivision surfaces. In some implementations, primitive analytic surfaces, such as planes, spheres, cones and tori, can be used. Each of the one or more editable smooth surfaces has been constructed from at least a portion of a polygon mesh, e.g., a triangle mesh, a tetrahedral mesh, a hexahedral mesh, or combinations thereof, where the polygon mesh has been obtained using a generative design process employing one or more input solids as one or more sub-spaces of an optimization domain of the generative design process. The one or more input solids are in a boundary representation format and were previously provided as input (either directly or after sampling to form an input mesh) to the generative design process. Note that more than one input solid is often used, and so the one or more input solids are referred to in this description as preserve bodies, plural, but more than on preserve body is not required.

Various generative design processes can be used to generate the organic body from the preserve bodies. In some implementations, the systems and techniques described in U.S. Patent Application No. 62/758,404, filed Nov. 9, 2018, and titled "MACROSTRUCTURE TOPOLOGY GENERATION WITH DISPARATE PHYSICAL SIMULATION FOR COMPUTER AIDED DESIGN AND MANUFACTURING", which application is hereby incorporated by reference, and/or the systems and techniques described in U.S. Patent Application No. 62/758,053, filed Nov. 9, 2018, and titled "CONVERSION OF GENERATIVE DESIGN GEOMETRY TO EDITABLE AND WATERTIGHT BOUNDARY REPRESENTATION IN COMPUTER AIDED DESIGN", which application is hereby incorporated by reference, are used. Further, to assist in clarity of the present disclosure, a brief overview of the generation of an organic body from preserve bodies is presented.

Figure 3A:
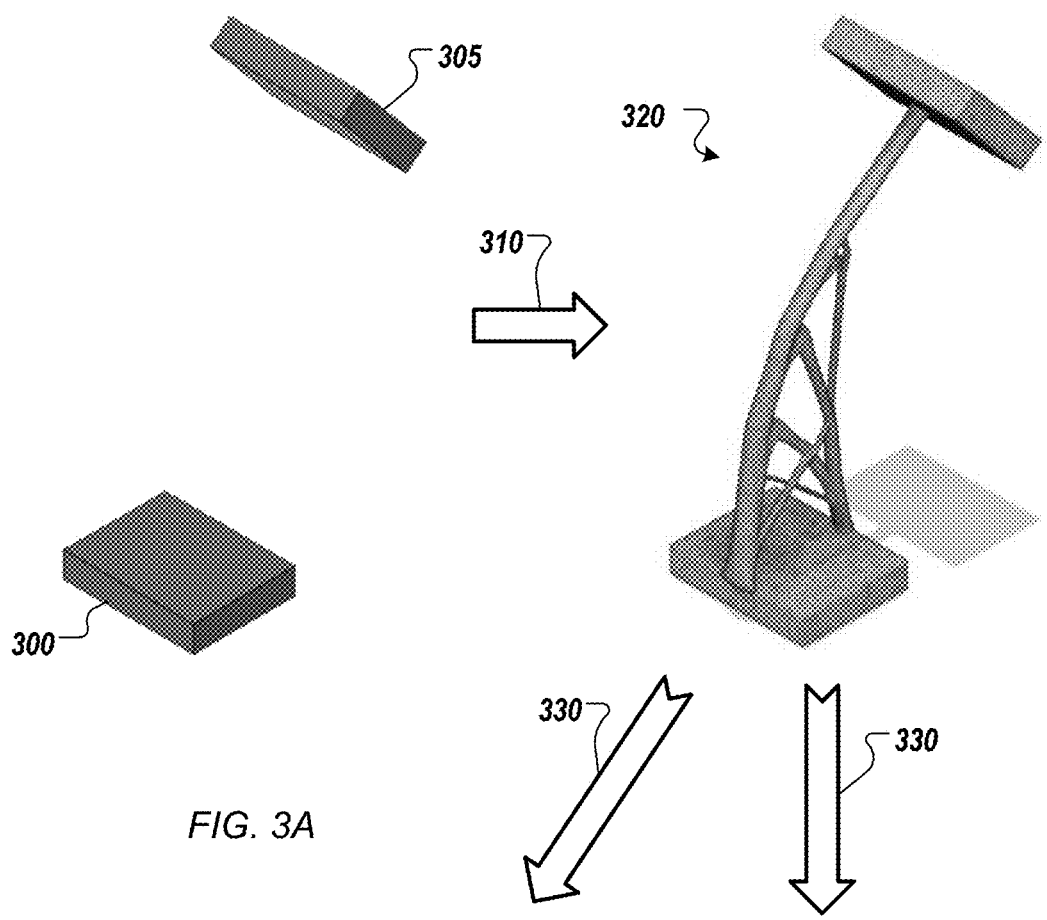
FIG. 3A shows an example of the production and separation of generative design geometry.
Figure 3A:
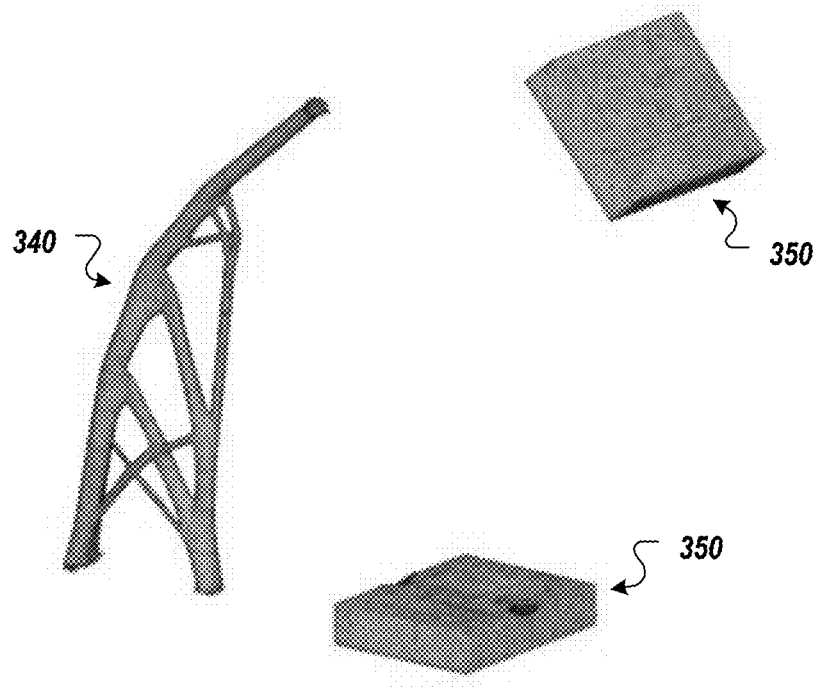

FIG. 3A shows an example of the production and separation of generative design geometry. Preserve bodies 300, 305 are provided for use by the generative solver of the generative design process 310 to indicate connection points with other components in a (potentially much larger) 3D B-Rep model being designed using the CAD system, as well as where loads and boundary conditions are applied. In some implementations, the generative design process 310 employs a volumetric mesh method or a level set method to produce the generative design, and the generative design process 310 can take multiple different types of inputs, including forces and other constraints to describe the physical requirements of the desired geometry. Based on these inputs, the generative design process 310 typically produces complex shapes and topologies as the process 310 discovers a 3D geometry that meets the specified design objectives. In any case, the output of the generative design process 310 is a 3D mesh model 320 (in this example, a triangle mesh, where each facet of the 3D model is a triangle). The mesh geometry of the 3D model 320 is undesirable in a CAD system for a number of reasons, including lack of precision and ease of editing due to the model being a collection of a large number of facets, defined by vertices and edges there between, which are only an approximation of the underlying represented surface. As will be appreciated, at least one portion of the mesh 320 corresponds to the preserve bodies 300, 305, and at least another portion of the mesh 320 corresponds to the newly produced generative design.

The mesh model 320 is then processed 330 to separate these respective portions from each other, resulting in a first portion 340 of the mesh 320 and a second portion 350 of the mesh 320. This can involve a fuzzy segmentation process, in which level-set distance fields (available from a generative design engine that employs a level set method of shape and topology optimization) are used to assign mesh triangles to either the first portion 340 (the generated region) or the second portion 350 (the preserve region) with a band of uncertainty in between.

The first portion 340 of the mesh 320 is then further processed to produce an organic body 360, as shown in FIG. 3B. The organic body 360 represents the main structural component of the newly produced generative design in that it connects and supports the loads and boundary conditions determined for the 3D B-Rep model being designed. Further, the second portion 350 of the mesh 320 is not need and so is discarded and replaced with the preserve bodies 300, 305. However, due to the uncertainty in the segmentation process (note the fuzzy segmentation referred to above) the organic body 360 should be produced so as to ensure it meets or intersects with the preserve bodies 300, 305, such as by employing the boundary pull process described in U.S. Patent Application No. 62/758,053, filed Nov. 9, 2018, and titled "CONVERSION OF GENERATIVE DESIGN GEOMETRY TO EDITABLE AND WATERTIGHT BOUNDARY REPRESENTATION IN COMPUTER AIDED DESIGN". The organic body 360 and the preserve bodies 300, 305 are then used as input to the process of FIG. 2.

Returning to FIG. 2, a visualization of the one or more editable smooth surfaces and the one or more input solids is rendered 205, e.g., by CAD program(s) 116, to a display device, e.g., display device(s) 120, 120a, presenting a user interface (UI) of the CAD program. Various options are available for the UI, as will be appreciated. In some implementations, the UI provides more than one type of parametric feature recipe to connect the smooth surface(s) with the input solid(s), and the user can select which of the available parametric feature recipes to instantiate. In some implementations, the UI provides a single type of parametric feature recipe to connect the smooth surface(s) with the input solid(s), and the single available parametric feature recipe can be instantiated automatically, or upon user request.

In any case, a parametric feature recipe is instantiated 210, e.g., by CAD program(s) 116, for the smooth surface(s) and the input solid(s), where the parametric feature recipe is used to connect the smooth surface(s) with the input solid(s). In general, a parametric feature recipe is a sequence of operations that are re-playable and editable, and that produce a result, i.e., a desired 3D geometry is produced by executing a series of features in a prescribed order in accordance with specified parameters. In the case at hand, the instantiated parametric feature recipe includes an operation sequence that (i) converts the one or more editable smooth surfaces into B-Rep format and (ii) combines the B-Rep formatted smooth surface(s) with the input solid(s) to produce a watertight three dimensional model of an object.

The user interface can then be updated 220 on the display device, e.g., display device(s) 120, 120a, to reflect the instantiated parametric feature recipe, and with the parametric feature recipe thus instantiated, the user is free to edit the smooth surface(s) as desired. As editing input is received from the user through an input device associated with the UI, e.g., input device(s) 118, 118a, the smooth surface(s) are modified 225, e.g., by CAD program(s) 116, accordingly, while disconnection of the smooth surface(s) from the input solid(s) is prevented. This preventing of disconnection can be achieved in various manners.

In some implementations, the interface between the smooth surface(s) and the input solid(s) is frozen. The interface here can be where the smooth surface(s) meet the input solid(s), where the smooth surface(s) intersect the input solid(s), or in the case of an intersection with penetration, a location within the input solid(s) where the smooth surface(s) end. In some implementations, the boundary edges at the end(s) of the smooth surface(s) are frozen, such that the user cannot move those boundary edges away from the input solid(s) and thus disconnect the smooth surface(s) from the input solid(s).

In some implementations, at least some editing of the interface between the smooth surface(s) and the input solid(s) is allowed, and a check is performed (either during or after an editing operation) to prevent disconnection of the smooth surface(s) from the input solid(s). In some implementations, the smooth surface(s) intersect and penetrate the input solid(s), and the boundary edges at the end(s) of the smooth surface(s) can be edited by the user, but the editing is compared with 3D space contained by the input solid(s), and any edits that would pull even a portion of the boundary edges outside of a minimum depth within the 3D space contained by the input solid(s) is prevented. In some implementations, the boundary edges at the end(s) of the smooth surface(s) can be edited by the user, but a trial intersection of the smooth surface(s) boundary curve with the input solid(s) is also performed, and if any intersection points are found where the curve passes from inside the input solid(s) to outside the input solid(s), this implies that a disconnection has occurred. When this occurs, either the user can be warned in the UI or automated steps can be performed to pull the boundary back into the input solid(s).

Regardless of the approach taken to prevent disconnection, the user is free to make substantial changes to an organic body without concern that a preserve body will be changed or that the organic body will be inadvertently disconnected from the preserve body. This disconnection prevention feature can be reflected in the UI, such as by greying out preserve bodies (or showing them as transparencies in the UI) and/or by showing the interface in a different color to highlight the fact that the interface is protected from disconnection while the editing proceeds. Further, the visualization presented in the UI on the display device, e.g., display device(s) 120, 120a, is updated 220 responsive to the modifications. Also, various types of editing operations are possible, such as described in further detail below.

When it is time to produce a B-Rep from the edited smooth surface(s), such as upon user selection of a B-Rep generation option, or automatically upon some other action by the user or the CAD program(s), e.g., the editing operations themselves, the operation sequence of the parametric feature recipe is performed 230, e.g., by CAD program(s) 116, to convert and combine the one or more editable smooth surfaces, as modified by the user input, with the one or more input solids to produce the watertight three dimensional model of the object. In some implementations, the parametric feature recipe is repeatedly performed 230 as the editing input is received (i.e., the process flows from modifying 225, to performing 230, and then to updating 220). Because the sequence of operations of the parametric feature recipe is re-playable (in addition to being editable), the watertight 3D model can be repeatedly reproduced responsive to the user's editing input.

In any case, the performing 230 involves converting 232 the editable smooth surface(s) into B-Rep format, and combining 234 the B-Rep surface(s) with the input solid(s). The resulting B-Rep geometry corresponds to the produced organic body, after the user editing. Moreover, the user is free to reenter the editing mode to modify 225 the editable smooth surface(s) once again or potentially modify the parametric feature recipe, as the sequence of operations of the parametric feature recipe are re-playable and editable. In addition, in some implementations, the editable smooth surface(s) can be converted to NURBS surface(s) and/or Catmull-Clark subdivision surface(s).

Further, because the result after the editing of the organic body is B-Rep geometry in a watertight 3D model, this facilitates further processing in that the precise mathematical surfaces are easier to work with using CAD modeling operations (e.g., geometric modeling operations, such as holes, fillets or shells, and creating assembly relationships, such as mechanical joints), physical simulation operations, and CAM operations. Thus, the watertight 3D model can be provided 240, e.g., by CAD program(s) 116, for use in manufacturing a physical structure corresponding to the object using one or more computer-controlled manufacturing systems, e.g., AM machine 170, SM machine 174, and/or other manufacturing machines. The providing 240 can involve saving the watertight 3D model to a permanent storage device for use in manufacturing the physical structure corresponding to the object using the one or more computer-controlled manufacturing systems. In some implementations, the providing 240 involves generating 242, e.g., by CAD program(s) 116, toolpath specifications for the computer-controlled manufacturing system(s) using the watertight 3D model, and manufacturing 244, e.g., by CAD program(s) 116, at least a portion of the physical structure corresponding to the object with the computer-controlled manufacturing system(s) using the toolpath specifications generated for the additive manufacturing machine.

FIG. 4A shows an example of a user interface 400 with a parametric feature recipe instantiated using the input of FIG. 3B. The UI 400 can include various interface elements to facilitate use of the UI 400, such as a browser UI element, a first generative design UI element, a document settings element, a named views element, an origin element, and a bodies element, as shown. In addition, a parametric recipe UI element 405 provides an interface to the parametric feature recipe, which organizes the inputs into different categories of geometry and provides an operation sequence to connect and combine those different categories of geometry to produce a B-Rep solid body, which can then be readily added into a source assembly by the CAD software, while the generated organic body remains readily editable within the CAD system.

Figure 4B:
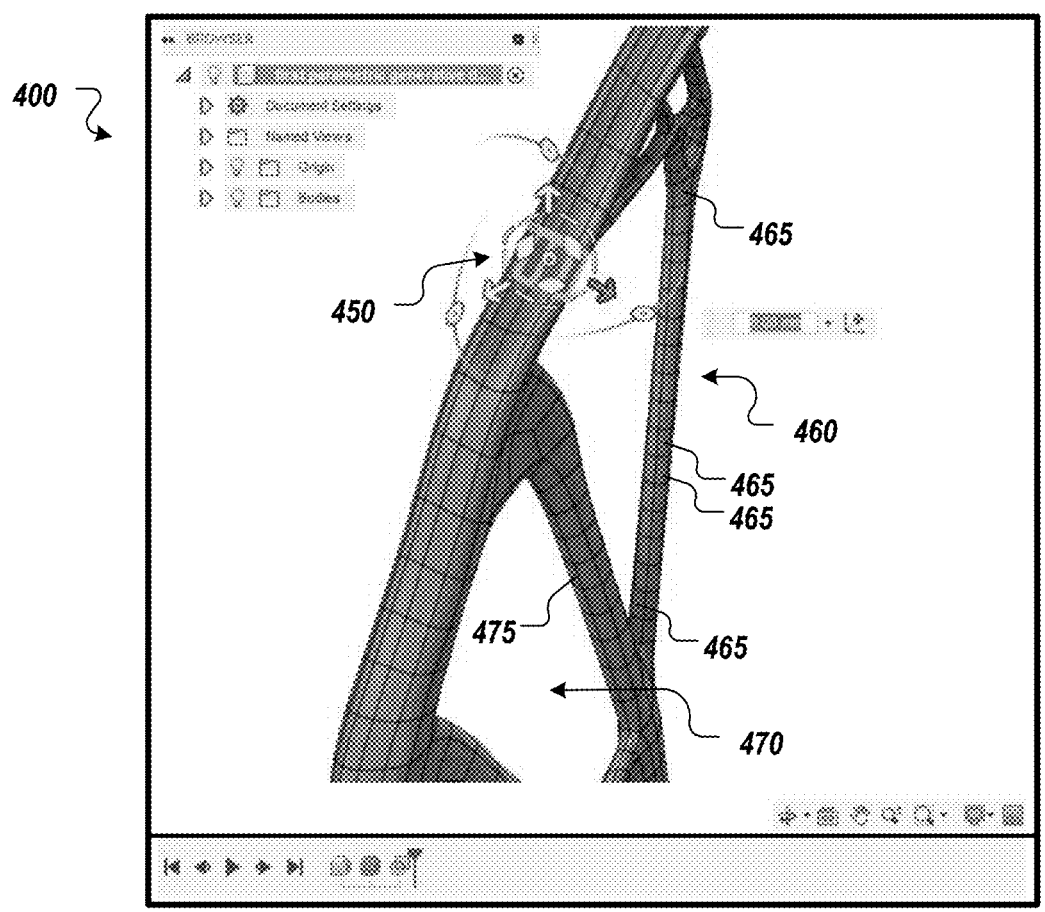
FIG. 4B shows an example of editing a T-Spline surface in the user interface of FIG. 4A.

In the example shown, the preserve bodies 300, 305 of FIG. 3B correspond to preserve bodies 410, which are associated with the parametric feature recipe, and the organic body 360 corresponds to organic body 415, which is associated with the parametric feature recipe and in this example, is a T-Spline. Note that the UI 400 can provide various options and levels of granularity for editing T-Spline surface(s). FIG. 4B shows an example of editing 450 a T-Spline surface in the UI 400 of FIG. 4A.

As will be appreciated, T-Spline surfaces are readily editable using a variety of different known UI interface elements. In addition, the UI 400 can provide various editing tools that are tailored for use with the varied shapes often created by generative design processes. For example, the UI 400 can include a whole strut tool that, rather than forcing the user to individually select facets 465 of the T-Spline, enables the user to select an entire strut 460 of the T-Spline, and then move the strut 460 as a unit, allowing quick changes to large numbers of facets that are automatically grouped together based on the topology of the organic body. Further, a UI element can enable automatic realignment of the moved facets of the selected strut 460. As another example, an erase and fill tool can automatically identify a hole 470 associated with a selected facet 475, based on the topology of the organic body, and enable removal of the hole 470 by filling it in with new facets created for the T-Spline. These types of UI elements, which take into consideration the complex topologies often created by generative design processes, facilitate the modification, addition and deletion of portions of the organic bodies that are produced by generative design methods.

Returning to FIG. 4A, to build the parametric recipe, each component 410, 415 can be tagged with attributes to label both the type of recipe they will be involved in and their role in that recipe. As noted above, various recipes are possible. But regardless of the recipe used, note that the T-Spline bodies are only partially editable. This is because the interfaces 420 between the components 410, 415 are preserved by preventing the T-Spline 415 from being disconnected from the preserve bodies 410 as changes are made. This ensures that, when the T-Spline 415 is converted into a B-Rep and combined with the preserve bodies 410 to produce a solid model, this solid model will be watertight and readily useable in downstream processing operations (e.g., CAD modeling, physical simulation, and CAM operations). By building the parametric feature recipe for the sequence of operations that convert and combine the organic body, the user is able to edit the organic geometry from the generative design process in its T-Spline form before it is converted.

A first example of a parametric feature recipe that can be employed is an intersecting boundary fill recipe. In the intersecting boundary fill recipe, the T-Spline surface 415 is made to extend into the preserve geometry 410. In some implementations, this extension of the T-Spline surface is performed by the process that generates the T-Spline from the generative design mesh (e.g., as described in U.S. Patent Application No. 62/758,053, filed Nov. 9, 2018, and titled "CONVERSION OF GENERATIVE DESIGN GEOMETRY TO EDITABLE AND WATERTIGHT BOUNDARY REPRESENTATION IN COMPUTER AIDED DESIGN"). Thus, the received organic body 360 can already include extensions 362, as shown in FIG. 3B.

In some implementations, the process that generates the T-Spline from the generative design mesh only ensures that the T-Spline surface meets the preserve body. In this case, or in the case where the T-Spline does not meet the preserve body, the end of the T-Spline can be extended, e.g., by the CAD program(s) 116, by an amount needed to ensure an intersection of the T-Spline with the preserve body, without the T-Spline passing all the way through the preserve body. This can be done before the intersecting boundary fill recipe is instantiated, or the instantiation of the intersecting boundary fill recipe can involve extending the T-Spline.

In some implementations, the T-Spline is extended by an amount that is sufficient to ensure that the T-Spline penetrates the preserve body by a distance larger than the resolution tolerance of the B-Rep kernel, but smaller than a distance that would cause the boundary to exit the preserve body once it has entered the preserve body. In some implementations, the boundary extension algorithm is iterative, and a threshold distance of penetration can be set such that the program terminates the iteration when the threshold has been met. The total distance of the extension can therefore be the gap between the original boundary to the preserve body, plus the penetration distance threshold. The gap between the original boundary to the preserve body is influenced by the width of the fuzzy region of the fuzzy segmentation, which is about twice the generative solver accuracy. The penetration distance threshold is influenced by the B-Rep kernel resolution accuracy (in practice for generative design it is safe to set the threshold to be much larger than the B-Rep resolution tolerance).

Figure 4C:
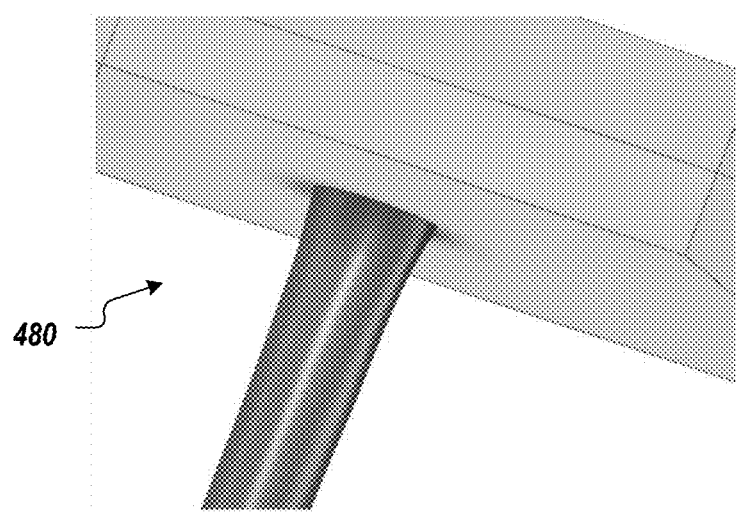
FIG. 4C shows a cutaway view of an example of a B-Rep solid formed from an organic body and a preserve body that are combined using an intersecting boundary fill parametric feature recipe.

Extending the ending edge boundaries of the organic body 415 into the preserve geometry 410 ensures that the organic body 415 intersects the preserve body 410 at the interface 420, which ensures the boundary fill feature will successfully produce a B-Rep solid 480 formed from the combination of the organic body 415 and the preserve body 410, as shown in FIG. 4C. Using an extended version of the T-Spline surface 415 causes the T-Spline 415 and the preserve body 410 to bound a closed volume that can be turned into a solid via a type of Boolean operation called boundary fill. This is a good choice of recipe because it allows some flexibility in the design of the T-Spline boundary, allowing the T-Spline to be optimized for lower T-Spline complexity and therefore higher editing performance and capabilities for the user. Note that the T-Spline is still prevented from being pulled out of the preserve body in that the noted flexibility provided in editing the boundary between the T-Spline and the preserve body 410 cannot cause a disconnection, i.e., the extended end of the T-Spline is prevented from being moved beyond a minimum embedded depth within the preserve body 410.

In the case of the intersecting boundary fill parametric feature recipe, there are three features that add to the model's editability: (1) a base body feature, (2) a form feature, and (3) a boundary fill feature. The base body feature includes the preserve bodies from the original design, and their geometry is preserved from the original design input B-Rep bodies. In the example of FIG. 4A, the preserve bodies are the precise block geometry composed of perpendicular planar B-Rep facets, but as will be appreciated, many different types of preserve bodies are possible.

The form feature contains the geometry which was generated by the generative solve process, but separated into its own feature. This feature includes the T-Spline geometry. This T-Spline geometry is referred to as the organic body because of the free-form nature of the geometry resulting from the generative design process. When this feature is edited, the CAD application is able to modify the T-Spline geometry directly, and this is the primary mechanism by which the user can directly modify the results of the generative solve.

The third feature in the intersecting boundary fill recipe is the boundary fill feature, which combines the solid preserve bodies with the organic body to produce a single solid result. This feature can operate by selecting cells from the intersections of the organic and preserve bodies, which means the organic and preserve bodies should either precisely meet, or the organic body should penetrate the preserve body. In other words, the boundary fill is a solid modelling feature that combines a set of intersecting bodies, which can be open surfaces and/or closed solids, and produces a result by selecting cells, which are sub-regions within the set of intersecting bodies.

Figure 5A:
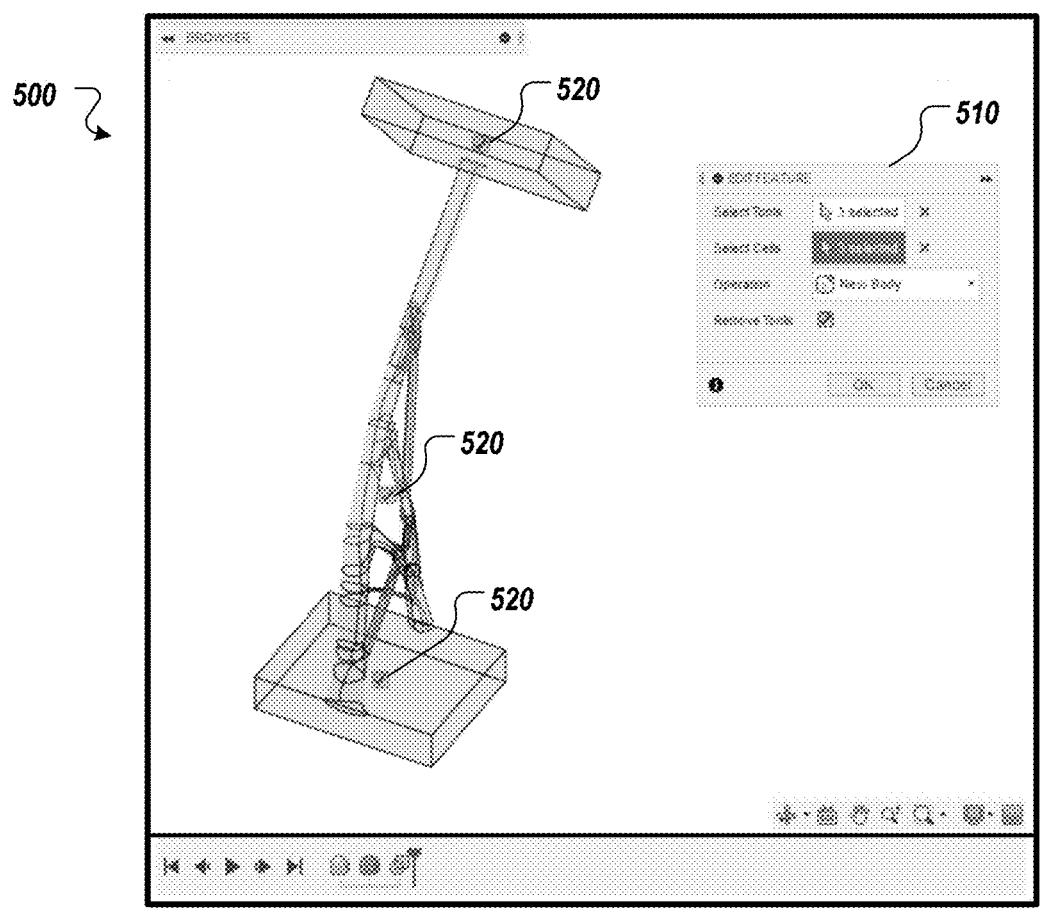
FIG. 5A shows an example of a user interface for a boundary fill command.

FIG. 5A shows an example of a user interface 500 for a boundary fill command. The UI 500 includes an edit feature interface element 510, which includes select tools, select cells, and operation interface elements, as well as a remove tools option. In this example, a preview of three cells 520 (corresponding to the preserve bodies and the organic body) are shown as selected, from which a final result will be obtained. This feature facilitates the editability of this recipe, and the flexibility of the cell selection algorithm allows the user to modify how the organic body is converted into a B-Rep solid, including potentially resizing some of the geometry of the organic body.

Figure 5B:
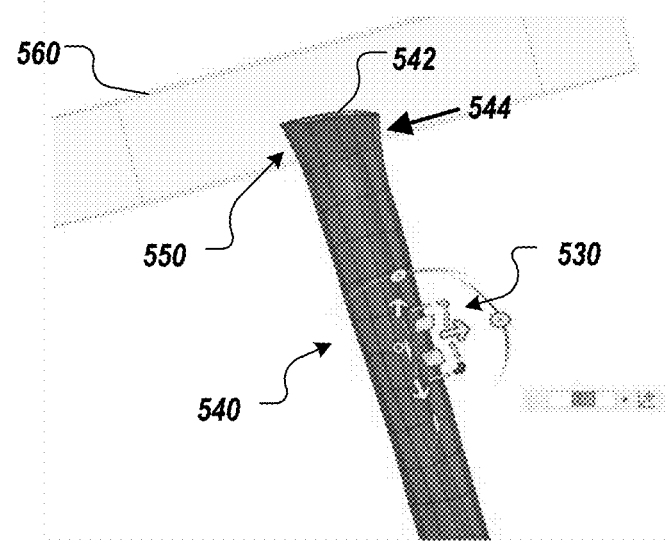
FIG. 5B shows a cutaway view of an example of editing of an organic body in the context of the intersecting boundary fill parametric feature recipe.

FIG. 5B shows a cutaway view of an example of editing 530 of an organic body 540 in the context of the intersecting boundary fill parametric feature recipe. Note that the organic body 540 has been extended and thus penetrates 550 the preserve body 560. As noted above, in some implementations, the UI still allows modification of the organic body 540 within the penetration 550. Thus, rather than preventing any modification of an end section 542 of a T-Spline surface, the CAD program(s) 116 can enable the user to modify the end section 542 of the T-Spline surface, while preventing the end section 542 of the T-Spline surface from being moved past a minimum depth position 544 within the preserve body 560. Further, as noted above, this minimum depth position 544 can apply to the entirety of the preserve body 560 (i.e., the end section 542 of the T-Spline surface is prevented from being moved outside of the preserve body 560), and the minimum depth position can be set as a distance that is larger than the resolution tolerance of the B-Rep kernel.

Upon finishing the editing operations, the parametric recipe for the design is re-computed, and the single final B-Rep solid geometry is updated to reflect the edits. Thus, the extended version of the T-spline surface 540, as modified by the user input, is converted into a modified surface in B-Rep format, a 3D region in which the modified surface in the B-Rep format penetrates 550 at least a portion of the input solid 560 is identified, and the identified 3D region is used to combine the modified surface in the B-Rep format with the input solid 560 to form a closed solid in the watertight 3D model of the object.

Figure 6:
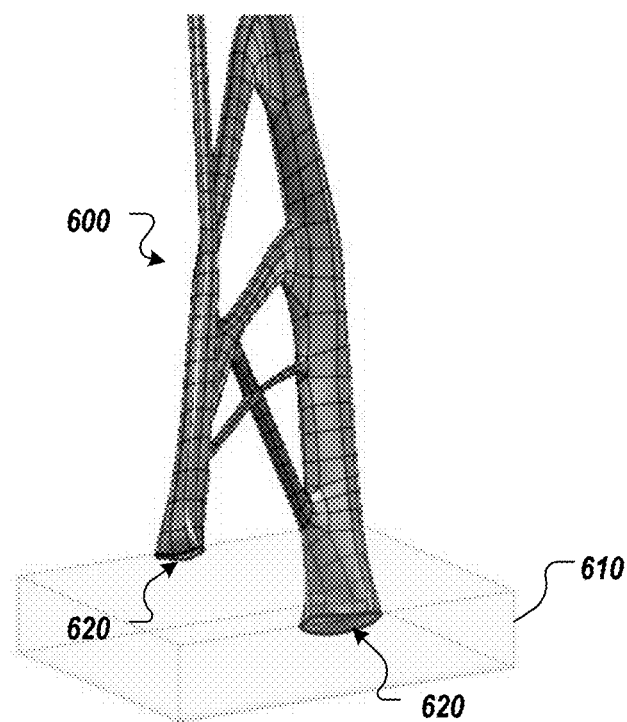
FIG. 6 shows a cutaway view of an example of an organic body meeting a preserve body in a Boolean combine parametric feature recipe.

As noted above, other parametric feature recipes are also possible. FIG. 6 shows a cutaway view of an example of an organic body 600 intersecting a preserve body 610 in a Boolean combine parametric feature recipe. In this recipe, the organic body 600, e.g., T-spline surface, as modified by the user input, is converted into a modified surface in the B-Rep format, the modified surface in the B-Rep format is closed off 620 to form a modified solid, and a Boolean combination of the modified solid with input solid 610 is performed to form a closed solid in the watertight 3D model of the object. In this recipe, as before, an end section of the organic body 600 should be prevented from being modified (e.g., frozen) in a manner that can result in gaps being formed between the organic body 600 and the preserve body 610 during editing by the user.

Figure 7:
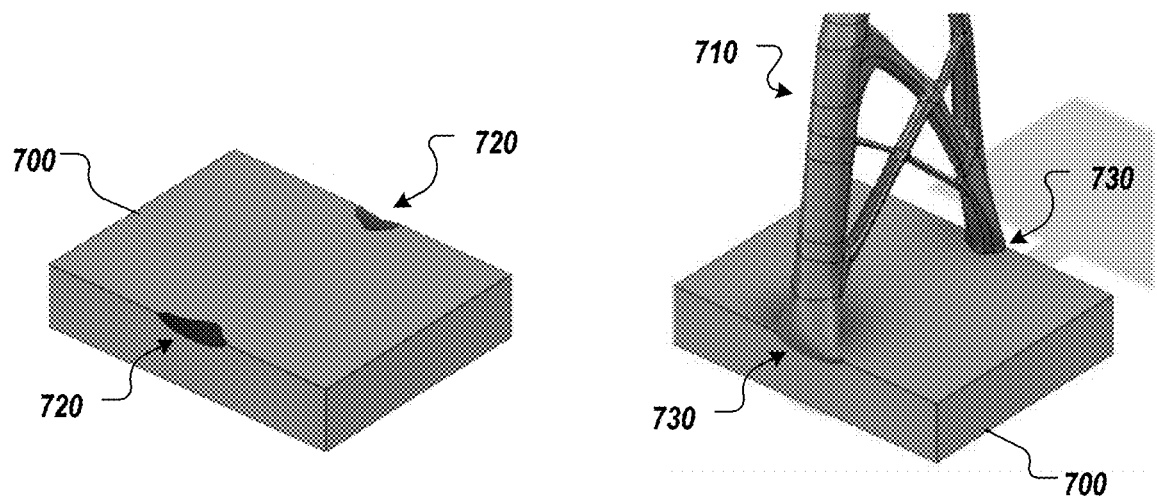
FIG. 7 shows an example of a modified preserve body and a cutaway view of an example of an organic body meeting the modified preserve body in a stitch parametric feature recipe.

FIG. 7 shows an example of a modified preserve body 700 and a cutaway view of an example of an organic body 710 meeting the modified preserve body 700 in a stitch parametric feature recipe. Surface portions of an input solid are cut out where the organic body 710, e.g., the T-Spline surface, meets or intersects with the input solid, thereby forming holes 720 in the input solid, i.e., producing the modified preserve body 700. The organic body 710, as modified by the user input, is converted into a modified surface in the B-Rep format, and the modified surface in the B-Rep format is stitched 730 to the input solid along edges of the holes 720 to form a closed solid in the watertight 3D model of the object.

In this recipe, disconnections or gaps should also be prevented. In practice, the boundary edges of the organic body 710 and the hole in the preserve body 700 should match exactly (within the modeling tolerance). In some implementations, the organic body 710 is projected onto the preserve body 700 such that the new boundary edges of the organic body 710 meet the preserve body 700 exactly (within the modeling tolerance). In some implementations, the organic body 710 is extended to intersect and penetrate the preserve body 700 (as described above), and then the extended organic body 710 is trimmed back such that the new boundary edges of the organic body 710 meet the preserve body 700 exactly (within the modeling tolerance).

Figure 8:
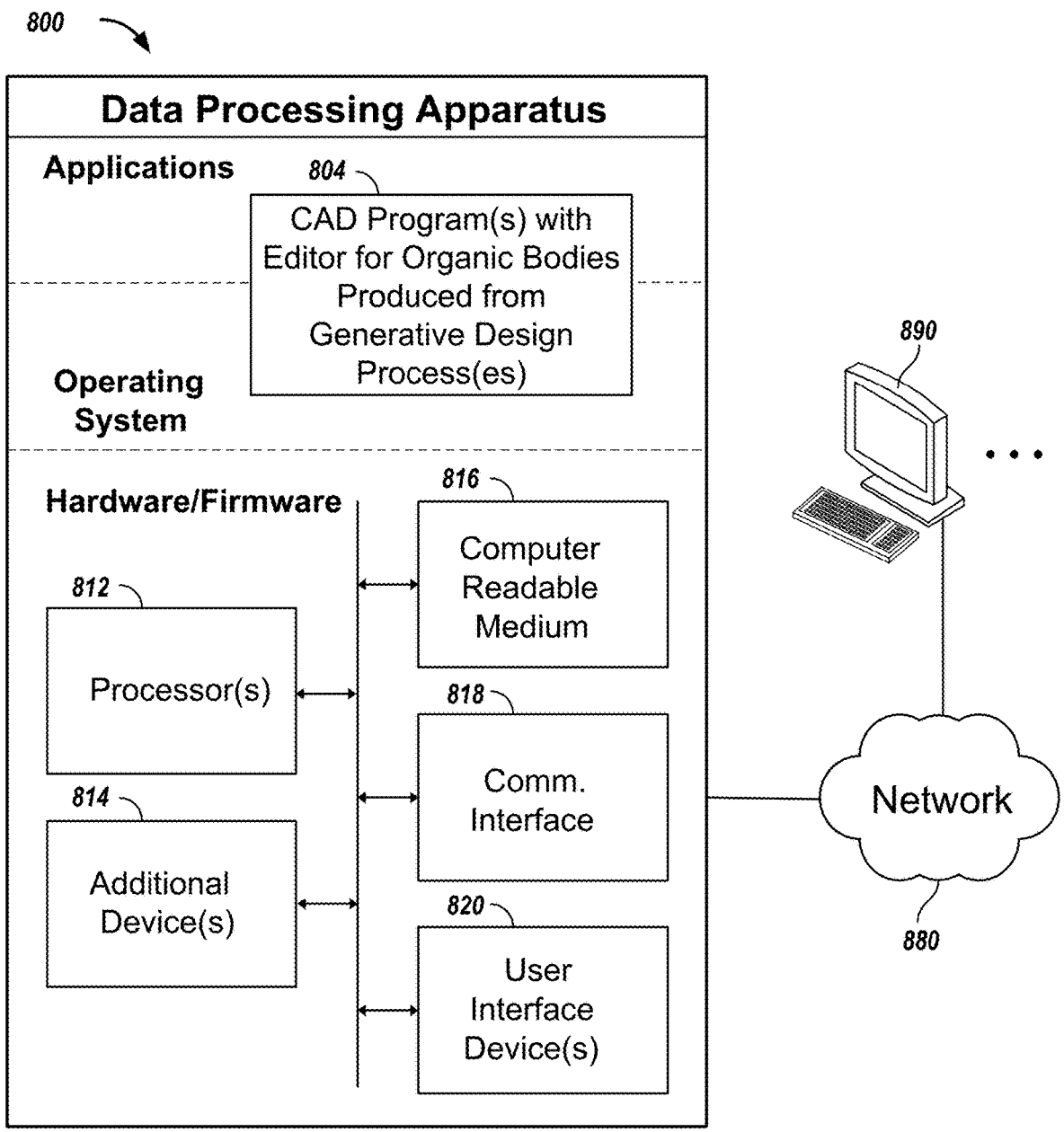
FIG. 8 is a schematic diagram of a data processing system including a data processing apparatus, which can be programmed as a client or as a server.

FIG. 8 is a schematic diagram of a data processing system including a data processing apparatus 800, which can be programmed as a client or as a server. The data processing apparatus 800 is connected with one or more computers 890 through a network 880. While only one computer is shown in FIG. 8 as the data processing apparatus 800, multiple computers can be used. The data processing apparatus 800 includes various software modules, which can be distributed between an applications layer and an operating system. These can include executable and/or interpretable software programs or libraries, including tools and services of one or more 3D modeling programs 804 that implement the systems and techniques described above. Thus, the 3D modeling program(s) 804 can be CAD program(s) 804 and can include an editor for organic bodies produced from one or more generative design processes. Further, the program(s) 804 can potentially implement physical simulation operations (finite element analysis (FEA) or other), generative design operations (e.g., using level-set based method(s) for generative design), and/or manufacturing control operations (e.g., generating and/or applying toolpath specifications to effect manufacturing of designed objects). The number of software modules used can vary from one implementation to another. Moreover, the software modules can be distributed on one or more data processing apparatus connected by one or more computer networks or other suitable communication networks.

The data processing apparatus 800 also includes hardware or firmware devices including one or more processors 812, one or more additional devices 814, a computer readable medium 816, a communication interface 818, and one or more user interface devices 820. Each processor 812 is capable of processing instructions for execution within the data processing apparatus 800. In some implementations, the processor 812 is a single or multi-threaded processor. Each processor 812 is capable of processing instructions stored on the computer readable medium 816 or on a storage device such as one of the additional devices 814. The data processing apparatus 800 uses the communication interface 818 to communicate with one or more computers 890, for example, over the network 880. Examples of user interface devices 820 include a display, a camera, a speaker, a microphone, a tactile feedback device, a keyboard, a mouse, and VR and/or AR equipment. The data processing apparatus 800 can store instructions that implement operations associated with the program(s) described above, for example, on the computer readable medium 816 or one or more additional devices 814, for example, one or more of a hard disk device, an optical disk device, a tape device, and a solid state memory device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a non-transitory computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, e.g., after delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that produces an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display) display device, an OLED (organic light emitting diode) display device, or another monitor, for displaying information to the user, and a keyboard and a pointing device, e.g., a mouse or a trackball, by which the user can provide input to the computer. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a browser user interface through which a user can interact with an implementation of the subject matter described is this specification, or any combination of one or more such back-end, middleware, or front-end components. The components of the system can be interconnected by any suitable form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In addition, actions recited in the claims can be performed in a different order and still achieve desirable results.

What is claimed is:

1. A method comprising:
receiving, by a computer aided design program, one or more editable smooth surfaces, wherein each of the one or more editable smooth surfaces has been constructed from at least a portion of a polygon mesh that has been obtained using a generative design process employing one or more input solids as one or more sub-spaces of an optimization domain of the generative design process, the one or more input solids being in a boundary representation format;
rendering, by the computer aided design program, a visualization of the one or more editable smooth surfaces and the one or more input solids to a display device presenting a user interface of the computer aided design program;
associating, by the computer aided design program, an operation sequence with the one or more editable smooth surfaces and the one or more input solids, wherein the operation sequence (i) converts the one or more editable smooth surfaces into the boundary representation format and (ii) combines the one or more boundary representation formatted smooth surfaces with the one or more input solids to produce a watertight three dimensional model of an object;
modifying, by the computer aided design program, the one or more editable smooth surfaces in response to user input received through an input device associated with the user interface of the computer aided design program, while preventing disconnection of the one or more editable smooth surfaces from the one or more input solids, to produce one or more modified editable smooth surfaces;
updating, by the computer aided design program, the visualization presented in the user interface on the display device responsive to the modifying; and
performing, by the computer aided design program, the operation sequence to convert and combine the one or more modified editable smooth surfaces with the one or more input solids to produce the watertight three dimensional model of the object.

2. The method of claim 1, wherein the operation sequence comprises:
converting an extended version of the one or more modified editable smooth surfaces into a modified surface in the boundary representation format;
identifying a three dimensional region in which the modified surface in the boundary representation format intersects at least a portion of the one or more input solids; and
using the identified three dimensional region to combine the modified surface in the boundary representation format with the one or more input solids to form a closed solid in the watertight three dimensional model of the object.

3. The method of claim 1, wherein the operation sequence comprises:
converting the one or more modified editable smooth surfaces into a modified surface in the boundary representation format;
closing off the modified surface in the boundary representation format to form a modified solid; and
performing a Boolean combination of the modified solid with the one or more input solids to form a closed solid in the watertight three dimensional model of the object.

4. The method of claim 1, wherein the one or more editable smooth surfaces comprise at least one T-Spline surface, at least one Non-Uniform Rational Basis Spline (NURBS) surface, or at least one Catmull-Clark subdivision surface, and the operation sequence comprises a series of features executed in a prescribed order in accordance with specified parameters to produce three dimensional geometry.

5. The method of claim 1, wherein the generative design process employs a volumetric mesh method or a level set method to produce a generative design, and the polygon mesh comprises a triangle mesh.

6. The method of claim 1, wherein the computer aided design program comprises two or more programs that operate cooperatively on two or more separate computer processors.

7. The method of claim 1, further comprising providing, by the computer aided design program, the watertight three dimensional model for use in manufacturing a physical structure corresponding to the object using one or more computer-controlled manufacturing systems.

8. The method of claim 7, wherein the providing comprises saving the watertight three dimensional model to a permanent storage device for use in manufacturing the physical structure corresponding to the object using the one or more computer-controlled manufacturing systems.

9. The method of claim 7, wherein the one or more computer-controlled manufacturing systems comprise an additive manufacturing machine, and the providing comprises:
generating toolpath specifications for the additive manufacturing machine using the watertight three dimensional model; and
manufacturing at least a portion of the physical structure corresponding to the object with the additive manufacturing machine using the toolpath specifications generated for the additive manufacturing machine.

10. The method of claim 1, comprising freezing, by the computer aided design program, a geometry interface between the one or more editable smooth surfaces and the one or more input solids to prevent disconnection of the one or more editable smooth surfaces from the one or more input solids during the modifying of the one or more editable smooth surfaces in response to the user input.

11. The method of claim 1, comprising checking, by the computer aided design program, a geometry interface between the one or more editable smooth surfaces and the one or more input solids to prevent disconnection of the one or more editable smooth surfaces from the one or more input solids during the modifying of the one or more editable smooth surfaces in response to the user input.

12. The method of claim 11, wherein the one or more editable smooth surfaces intersect and penetrate the one or more input solids at the geometry interface, and checking the geometry interface comprises preventing any edits of one or more boundary edges of the one or more editable smooth surfaces from pulling even a portion of the one or more boundary edges outside of a minimum depth within a three dimensional space contained by the one or more input solids.

13. The method of claim 12, wherein the minimum depth is larger than a resolution tolerance of a boundary representation kernel of the computer aided design program, and rendering the visualization comprises showing the geometry interface is protected from disconnection while editing proceeds in the user interface.

14. A system comprising:
a non-transitory storage medium having instructions of a computer aided design program stored thereon; and
one or more data processing apparatus communicatively coupled with the non-transitory storage medium to run the instructions of the computer aided design program, the one or more data processing apparatus being configured by the instructions of the computer aided design program to: receive one or more editable smooth surfaces, wherein each of the one or more editable smooth surfaces has been constructed from at least a portion of a polygon mesh that has been obtained using a generative design process employing one or more input solids as one or more sub-spaces of an optimization domain of the generative design process, the one or more input solids being in a boundary representation format; render a visualization of the one or more editable smooth surfaces and the one or more input solids to a display device presenting a user interface of the computer aided design program; associate an operation sequence with the one or more editable smooth surfaces and the one or more input solids, wherein the operation sequence (i) converts the one or more editable smooth surfaces into the boundary representation format and (ii) combines the one or more boundary representation formatted smooth surfaces with the one or more input solids to produce a watertight three dimensional model of an object; modify the one or more editable smooth surfaces in response to user input received through an input device associated with the user interface of the computer aided design program, while preventing disconnection of the one or more editable smooth surfaces from the one or more input solids, to produce one or more modified editable smooth surfaces; update the visualization presented in the user interface on the display device responsive to production of the one or more modified editable smooth surfaces; and perform the operation sequence to convert and combine the one or more modified editable smooth surfaces with the one or more input solids to produce the watertight three dimensional model of the object.

15. The system of claim 14, wherein the operation sequence comprises: conversion of an extended version of the one or more modified editable smooth surfaces into a modified surface in the boundary representation format; identification of a three dimensional region in which the modified surface in the boundary representation format intersects at least a portion of the one or more input solids; and usage of the identified three dimensional region to combine the modified surface in the boundary representation format with the one or more input solids to form a closed solid in the watertight three dimensional model of the object.

16. The system of claim 14, wherein the operation sequence comprises: conversion of the one or more modified editable smooth surfaces into a modified surface in the boundary representation format; closure of the modified surface in the boundary representation format to form a modified solid; and a Boolean combination of the modified solid with the one or more input solids to form a closed solid in the watertight three dimensional model of the object.

17. The system of claim 14, wherein the one or more editable smooth surfaces comprise at least one T-Spline surface, at least one Non-Uniform Rational Basis Spline (NURBS) surface, or at least one Catmull-Clark subdivision surface, and the operation sequence comprises a series of features executed in a prescribed order in accordance with specified parameters to produce three dimensional geometry.

18. The system of claim 14, wherein the generative design process employs a volumetric mesh method or a level set method to produce a generative design, and the polygon mesh comprises a triangle mesh.

19. The system of claim 14, wherein the computer aided design program comprises two or more programs that operate cooperatively on two or more separate computer processors.

20. The system of claim 14, wherein the one or more data processing apparatus are configured by the instructions of the computer aided design program to provide the watertight three dimensional model for use in manufacturing a physical structure corresponding to the object using one or more computer-controlled manufacturing systems.

21. The system of claim 20, wherein the one or more data processing apparatus are configured by the instructions of the computer aided design program to save the watertight three dimensional model to a permanent storage device for use in manufacturing the physical structure corresponding to the object using the one or more computer-controlled manufacturing systems.

22. The system of claim 14, comprising an additive manufacturing machine, wherein the one or more data processing apparatus are configured by the instructions of the computer aided design program to generate toolpath specifications for the additive manufacturing machine from the watertight three dimensional model, and manufacture the physical structure corresponding to the object with the additive manufacturing machine using the toolpath specifications.

23. The system of claim 14, wherein the one or more data processing apparatus are configured by the instructions of the computer aided design program to freeze a geometry interface between the one or more editable smooth surfaces and the one or more input solids to prevent disconnection of the one or more editable smooth surfaces from the one or more input solids during modification of the one or more editable smooth surfaces in response to the user input.

24. The system of claim 14, wherein the one or more data processing apparatus are configured by the instructions of the computer aided design program to check a geometry interface between the one or more editable smooth surfaces and the one or more input solids to prevent disconnection of the one or more editable smooth surfaces from the one or more input solids during modification of the one or more editable smooth surfaces in response to the user input.

25. The system of claim 24, wherein the one or more editable smooth surfaces intersect and penetrate the one or more input solids at the geometry interface, and the one or more data processing apparatus are configured by the instructions of the computer aided design program to prevent any edits of one or more boundary edges of the one or more editable smooth surfaces from pulling even a portion of the one or more boundary edges outside of a minimum depth within a three dimensional space contained by the one or more input solids.

26. The system of claim 25, wherein the minimum depth is larger than a resolution tolerance of a boundary representation kernel of the computer aided design program, and the one or more data processing apparatus are configured by the instructions of the computer aided design program to render the visualization to show the geometry interface is protected from disconnection while editing proceeds in the user interface.

27. A non-transitory computer-readable medium encoding a computer aided design program operable to cause one or more data processing apparatus to perform operations comprising:

receiving, by the computer aided design program, one or more editable smooth surfaces, wherein each of the one or more editable smooth surfaces has been constructed from at least a portion of a polygon mesh that has been obtained using a generative design process employing one or more input solids as one or more sub-spaces of an optimization domain of the generative design process, the one or more input solids being in a boundary representation format;

rendering, by the computer aided design program, a visualization of the one or more editable smooth surfaces and the one or more input solids to a display device presenting a user interface of the computer aided design program;

associating, by the computer aided design program, an operation sequence with the one or more editable smooth surfaces and the one or more input solids, wherein the operation sequence (i) converts the one or more editable smooth surfaces into the boundary representation format and (ii) combines the one or more boundary representation formatted smooth surfaces with the one or more input solids to produce a watertight three dimensional model of an object;

modifying, by the computer aided design program, the one or more editable smooth surfaces in response to user input received through an input device associated with the user interface of the computer aided design program, while preventing disconnection of the one or more editable smooth surfaces from the one or more input solids, to produce one or more modified editable smooth surfaces;

updating, by the computer aided design program, the visualization presented in the user interface on the display device responsive to the modifying; and performing, by the computer aided design program, the operation sequence to convert and combine the one or more modified editable smooth surfaces with the one or more input solids to produce the watertight three dimensional model of the object.

28. The non-transitory computer-readable medium of claim 27, wherein the operation sequence comprises:
converting an extended version of the one or more modified editable smooth surfaces into a modified surface in the boundary representation format;
identifying a three dimensional region in which the modified surface in the boundary representation format intersects at least a portion of the one or more input solids; and
using the identified three dimensional region to combine the modified surface in the boundary representation format with the one or more input solids to form a closed solid in the watertight three dimensional model of the object.

29. The non-transitory computer-readable medium of claim 27, wherein the operation sequence comprises:
converting the one or more modified editable smooth surfaces into a modified surface in the boundary representation format;
closing off the modified surface in the boundary representation format to form a modified solid; and
performing a Boolean combination of the modified solid with the one or more input solids to form a closed solid in the watertight three dimensional model of the object.

30. The non-transitory computer-readable medium of claim 27, wherein the one or more editable smooth surfaces comprise at least one T-Spline surface, at least one Non-Uniform Rational Basis Spline (NURBS) surface, or at least one Catmull-Clark subdivision surface, and the operation sequence comprises a series of features executed in a prescribed order in accordance with specified parameters to produce three dimensional geometry.

31. The non-transitory computer-readable medium of claim 27, wherein the generative design process employs a volumetric mesh method or a level set method to produce a generative design, and the polygon mesh comprises a triangle mesh.

32. The non-transitory computer-readable medium of claim 27, wherein the computer aided design program comprises two or more programs that operate cooperatively on two or more separate computer processors.

33. The non-transitory computer-readable medium of claim 27, wherein the computer aided design program is operable to cause the one or more data processing apparatus to perform operations comprising providing, by the computer aided design program, the watertight three dimensional model for use in manufacturing a physical structure corresponding to the object using one or more computer-controlled manufacturing systems.

34. The non-transitory computer-readable medium of claim 33, wherein the providing comprises saving the watertight three dimensional model to a permanent storage device for use in manufacturing the physical structure corresponding to the object using the one or more computer-controlled manufacturing systems.

35. The non-transitory computer-readable medium of claim 34, wherein the one or more computer-controlled manufacturing systems comprise an additive manufacturing machine, and the providing comprises:
generating toolpath specifications for the additive manufacturing machine using the watertight three dimensional model; and
manufacturing at least a portion of the physical structure corresponding to the object with the additive manufacturing machine using the toolpath specifications generated for the additive manufacturing machine.

36. The non-transitory computer-readable medium of claim 27, wherein the computer aided design program is operable to cause the one or more data processing apparatus to perform operations comprising freezing, by the computer aided design program, a geometry interface between the one or more editable smooth surfaces and the one or more input solids to prevent disconnection of the one or more editable smooth surfaces from the one or more input solids during the modifying of the one or more editable smooth surfaces in response to the user input.

37. The non-transitory computer-readable medium of claim 27, wherein the computer aided design program is operable to cause the one or more data processing apparatus to perform operations comprising checking, by the computer aided design program, a geometry interface between the one or more editable smooth surfaces and the one or more input solids to prevent disconnection of the one or more editable smooth surfaces from the one or more input solids during the modifying of the one or more editable smooth surfaces in response to the user input.

38. The non-transitory computer-readable medium of claim 37, wherein the one or more editable smooth surfaces intersect and penetrate the one or more input solids at the geometry interface, and checking the geometry interface comprises preventing any edits of one or more boundary edges of the one or more editable smooth surfaces from pulling even a portion of the one or more boundary edges outside of a minimum depth within a three dimensional space contained by the one or more input solids.

39. The non-transitory computer-readable medium of claim 38, wherein the minimum depth is larger than a resolution tolerance of a boundary representation kernel of the computer aided design program, and rendering the visualization comprises showing the geometry interface is protected from disconnection while editing proceeds in the user interface.

* * * * *